United States Patent
Yamada et al.

(10) Patent No.: US 7,058,080 B1
(45) Date of Patent: Jun. 6, 2006

(54) CELL DISASSEMBLY DEVICE, CELL DISASSEMBLY METHOD AND COMPUTER-READABLE RECORDING MEDIUM IN WHICH PROGRAM FOR MAKING COMPUTER EXECUTE THE METHOD IS RECORDED

(75) Inventors: Hirotoshi Yamada, Tokyo (JP); Kentaro Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 827 days.

(21) Appl. No.: 09/857,494

(22) PCT Filed: Oct. 5, 2000

(86) PCT No.: PCT/JP00/06955

§ 371 (c)(1),
(2), (4) Date: Jun. 6, 2001

(87) PCT Pub. No.: WO01/26304

PCT Pub. Date: Apr. 12, 2001

(30) Foreign Application Priority Data

Oct. 7, 1999 (JP) .................................. 11-287381

(51) Int. Cl.
*H04J 3/16* (2006.01)
*H04J 3/22* (2006.01)
*H04J 3/06* (2006.01)

(52) U.S. Cl. ...................................... 370/466; 370/516
(58) Field of Classification Search ................ 370/474, 370/395.61, 395.1, 244, 473, 468, 412, 516, 370/517, 352, 466
See application file for complete search history.

(56) References Cited

U.S. PATENT DOCUMENTS

| | | | | |
|---|---|---|---|---|
| 5,412,655 A | * | 5/1995 | Yamada et al. | 370/474 |
| 5,541,926 A | * | 7/1996 | Saito et al. | 370/474 |
| 6,195,346 B1 | * | 2/2001 | Pierson, Jr. | 370/352 |
| 6,349,101 B1 | * | 2/2002 | Yamashita | 370/412 |
| 6,529,523 B1 | * | 3/2003 | Kato | 370/466 |
| 6,556,568 B1 | * | 4/2003 | Sasaki | 370/395.1 |
| 6,560,219 B1 | * | 5/2003 | Tabu et al. | 370/352 |
| 6,614,760 B1 | * | 9/2003 | Suzuki et al. | 370/244 |
| 6,671,289 B1 | * | 12/2003 | Tamura et al. | 370/474 |

(Continued)

FOREIGN PATENT DOCUMENTS

EP 0531772 3/1993

(Continued)

OTHER PUBLICATIONS

Recommendation I.363.1 B-ISDN ATm Adaptation Layer Specification: Type 1 AAL of ITU-T (Telecommunication Standardization Sector of International Telecommunication Union).

(Continued)

*Primary Examiner*—Hassan Kizou
*Assistant Examiner*—Gregory Sefcheck
(74) *Attorney, Agent, or Firm*—Birch, Stewart, Kolasch & Birch, LLP

(57) ABSTRACT

In a cell assembly and disassembly device having a cell disassembly unit (2) for disassembling the cell received from an ATM circuit interface, extracting data from the payload, distributing the data in plural time slots divided and multiplexed in time in frame period, and sending out to an STM circuit interface, the cell disassembly unit (2) comprises a fluctuation absorption buffer unit (11) provided in each time slot, and the data distributed in each time slot is once held in these buffers to absorb cell fluctuations, thereby suppressing both increase of total capacity of the memory for absorbing fluctuations and complication of memory control circuit, and reducing the cost.

20 Claims, 29 Drawing Sheets

U.S. PATENT DOCUMENTS

| | | | |
|---|---|---|---|
| 6,721,336 B1* | 4/2004 | Witel et al. | 370/474 |
| 6,741,598 B1* | 5/2004 | Murakami et al. | 370/395.6 |
| 6,757,288 B1* | 6/2004 | Deml et al. | 370/395.7 |
| 6,775,266 B1* | 8/2004 | Furtenback et al. | 370/352 |
| 6,970,467 B1* | 11/2005 | Sunaga et al. | 370/395.1 |
| 2002/0093949 A1* | 7/2002 | Yasue et al. | 370/356 |

FOREIGN PATENT DOCUMENTS

| | | |
|---|---|---|
| JP | 6373323 | 4/1988 |
| JP | 2234544 | 9/1990 |
| JP | 8331149 | 12/1996 |
| JP | 10200535 | 7/1998 |
| JP | 10313315 | 11/1998 |
| JP | 11145981 | 5/1999 |
| JP | 2959448 | 7/1999 |
| JP | 11252110 | 9/1999 |

OTHER PUBLICATIONS

Kazuo Sakagawa, et al., "Multichannel Voice Line-Set for High Speed Multimedia Packet Switching Node," General National Meeting in 1986 of the Institute of Electronics, Information and Communication Engineers, published Mar. 23-26, 1986.

Takenori Okutani, et al., "A Study on Buffer Addressing Control in Cell Disassembling for Multi-Rate CBR Connections," Autumn Meeting in 1993 of the Institute of Electronics, Information and Communication Engineers, published Sep. 5-8, 1993.

* cited by examiner

1

CELL DISASSEMBLY DEVICE, CELL DISASSEMBLY METHOD AND COMPUTER-READABLE RECORDING MEDIUM IN WHICH PROGRAM FOR MAKING COMPUTER EXECUTE THE METHOD IS RECORDED

This application is the national phase under 35 U.S.C. § 371 of PCT International Application No. PCT/JP00/06955 which has an International filing date of Oct. 5, 2000, which designated the United States of America and was not published in English.

TECHNICAL FIELD

The present invention relates to a cell disassembly device such as CLAD (cell assembly and disassembly device) which can transmit and receive effective data (effective time slot) on STM (synchronous transfer mode) circuit having plural time slots (TS) divided and multiplexed in time in frame period through ATM (asynchronous transfer mode) network, by using, for example, SDT (structured data transfer) method designated in Recommendation I.363.1 B-ISDN ATM Adaptation Layer Specification: Type 1 AAL of ITU-T (Telecommunication Standardization Sector of International Telecommunication Union), a cell disassembly method, and a computer-readable recording medium recording a program for executing this method on a computer. More particularly, this invention relates to a cell disassembly device for absorbing fluctuations of cells by a buffer, a cell disassembly method, and a computer-readable recording medium recording a program for executing this method on a computer.

BACKGROUND ART

Recently, the ATM communication is noticed as a new communication method for the multimedia age. In the conventional STM communication method, during communication, the physical circuit of the STM network is always occupied in every media between terminals, but in the ATM communication system, the circuit between terminals is set as a logic virtual path, and the physical circuit is occupied dynamically only by the necessary portion depending on the necessity, so that an efficient multimedia communication is realized.

FIG. 26 shows a configuration of a system for transmitting and receiving data on the STM circuit through the ATM network by using a conventional cell assembly and disassembly device (cell disassembly device). Reference numerals 61*a*, 61*b*, and 61*c* denote conventional cell assembly and disassembly devices which can transmit and receive the effective data on the STM circuit by transforming into ATM cells (hereinafter called cells), reference numeral 63 denotes an ATM network for communication in asynchronous transfer mode, 62*a*, 62*b*, and 62*c* denote STM circuit interfaces, reference numerals 64*a*, 64*b*, and 64*c* denote ATM circuit interfaces, and reference numerals 65*a* and 65*b* denote virtual paths set on the ATM network 63.

In the STM/ATM communication system having such configuration, effective data (continuous data) for the STM circuit interface 62*b* entered in the cell assembly and disassembly device 61*a* from the STM circuit interface 62*a* is sequentially assembled into a cell, which is a 53-byte fixed length packet, in the cell assembly and disassembly device 61*a*, and is provided with VPI (virtual path identifier) #1 in the header, and is transmitted to the ATM network 63 at a specific speed. Consequently, the cell transferred on the virtual path 65*a* according to VPI#1 is received in the cell assembly and disassembly device 61*b*, and is returned from the cell into the original continuous data herein, and is transmitted to the STM circuit interface 62*b*.

Similarly, as a flow in reverse direction, effective data for the STM circuit interface 62*a* entered in the cell assembly and disassembly device 61*b* from the STM circuit interface 62*b* is sequentially assembled into a cell in the cell assembly and disassembly device 61*b*, and is provided with VPI#1 in the header, and is transmitted to the ATM network 63 at a specific speed. Consequently, the cell transferred on the virtual path 65*a* according to VPI#1 is received in the cell assembly and disassembly device 61*a*, and is returned into the original continuous data herein, and is transmitted to the STM circuit interface 62*a*.

On the other hand, effective data (continuous data) for the STM circuit interface 62*c* entered in the cell assembly and disassembly device 61*a* from the STM circuit interface 62*a* is sequentially assembled into a cell in the cell assembly and disassembly device 61*a*, and is provided with VPI#2 in the header, and is transmitted to the ATM network 63 at a specific speed. Consequently, the cell transferred on the virtual path 65*b* according to VPI#2 is received in the cell assembly and disassembly device 61*c*, and is returned from the cell into the original continuous data herein, and is transmitted to the STM circuit interface 62*c*.

Similarly, as a flow in reverse direction, effective data for the STM circuit interface 62*a* entered in the cell assembly and disassembly device 61*c* from the STM circuit interface 62*c* is sequentially assembled into a cell in the cell assembly and disassembly device 61*c*, and is provided with VpI#2 in the header, and is transmitted to the ATM network 63 at a specific speed. Consequently, the cell transferred on the virtual path 65*b* according to VPI#2 is received in the cell assembly and disassembly device 61*a*, and is returned into the original continuous data herein, and is transmitted to the STM circuit interface 62*a*.

The cell assembly and disassembly device 61 (cell assembly and disassembly device 61*a*, 61*b*, or 61*c*) has a structure as shown in a functional block diagram in FIG. 27. The cell assembly and disassembly device 61 comprises the ATM circuit interface unit 71 for terminating the ATM circuit interface (physical layer processing), the cell assembly unit 73 for forming the continuous data received from STM circuit interface unit 72 into a cell, the cell disassembly unit 74 ford is assembling the cell received from the ATM circuit interface unit 71 to restore into continuous data, the STM circuit interface 72 for terminating the STM circuit interface, and the device management unit 75 for managing the entire devices of the cell assembly and disassembly device 61. The ATM circuit interface 64 may be any one of the ATM circuit interfaces 64*a*, 64*b*, and 64*c*, and the STM circuit interface 62 may be any one of the STM circuit interfaces 62*a*, 62*b*, and 62*c*.

According to the ITU-T, in the ITU-T Recommendation I.363.1, the structured data transfer method is designated as the cell transfer method of data on the STM circuit having a specific frame period through the ATM network 63. A cell format used in the conventional structured data transfer method is shown in FIG. 21. The cell assembly unit 73 divides only the effective data extracted from arbitrary plural time slots, out of the STM circuit interface 62 composed of [64 kb/s]×n (n: natural number) time slots (TS), in the unit of 46 bytes (in the case of P format) or 47 bytes (in the case of non-P format), adds AAL1 (ATM adaptation layer type 1) header and ATM header (including VPI), assembles the cell in the format shown in FIG. 28 by destination (virtual path 65), and transmits to the ATM circuit interface unit 71. The virtual path 65 is either virtual path 65a or virtual path 65b.

On the other hand, the cell disassembly unit 74 analyzes the VPI in the header of the cell received from the ATM circuit interface unit 71, judges the sender (virtual path 65), analyzes the sequence number in the AAL1 header, detects cell discarding and insertion of wrong cell, and processes countermeasures, absorbs delay fluctuations occurring during cell transfer in the ATM network 63 in every virtual path 65, distributes the data extracted from the payload into necessary time slots according to the sender, and transmits to the STM circuit interface unit 72. Further, the cell disassembly unit 74, when receiving a cell in P format, analyzes the pointer field, detects the boundary of frame period in the STM circuit, and determines assignment of which byte of the data extracted from the payload in which time slot.

The cell disassembly unit 74 has a structure as shown in a functional block diagram in FIG. 29. The cell disassembly unit 74 comprises following units. The AAL1 processor 81 for extracting the VPI and data (including frame boundary information) from the received cell, and transmitting respectively to a write controller 83 and the fluctuation absorption buffer unit 82. The fluctuation absorption buffer unit 82 for temporarily storing the data extracted from the payload of the received cell together with the frame boundary information directly in every virtual path 65 (VPI), and absorbing the delay fluctuation occurring during cell transfer in the ATM network 63. The write controller 83 for analyzing the received VPI, judging the sender (virtual path 65), and generating a write signal to the fluctuation absorption buffer unit 82 on the basis thereof. The buffer monitor unit 84 for monitoring the data accumulated amount in the fluctuation absorption buffer unit 82 in every virtual path 65 (VPI), and controlling the operation of the write controller 83 and read controller 85 on the basis thereof. The read controller 85 for reading out the data from the fluctuation absorption buffer unit 82 according to the timing information from the STM circuit interface unit 72 and distributing into necessary time slots. The VP/TS conversion table 86 for storing the corresponding relation of the virtual path 65 and distribution time slots, and noticing to the read controller 85.

The fluctuation absorption buffer 82 has a structure as shown in a functional block diagram in FIG. 30. The fluctuation absorption buffer 82 comprises following units. The separator 91 for distributing the write data and frame boundary information from the AAL1 processor 81 into individual buffers VPB1 (VPI#1) to VPBm (VPI#m) in a cell buffer 92 according to the instruction (write signal) from the write controller 83. The cell buffer 92 for storing the write data and frame boundary information temporarily in each virtual path 65 (VPI). The multiplexer 93 for multiplexing the data and frame boundary information being red out from the individual buffer VPB1 to VPBm in the cell buffer 92 according to the instruction (read signal) from the read controller 85. VPTH1 to VPTHm are the reading-start thresholds set respectively in the buffer VPB1 to VPBm. Although VPTH1 to VPTHm are shown in FIG. 30, they will utilized in the explanation of operation provided later. These thresholds are actually stored in the buffer monitor unit 84.

The device management unit 75 shown in FIG. 27 manages the entire structure of the cell assembly and disassembly device 61, and sets necessary parameters and collects status in the individual units of the cell disassembly unit 74, ATM circuit interface unit 71, cell assembly unit 73, and STM circuit interface unit 72. To realize this function, the device management unit 75 and individual units are connected through a control bus. For the sake of simplicity of the functional block diagram, the control bus is show in FIG. 27 only, but for setting of parameters and collection of status, sub-blocks in individual units shown in FIG. 27, for example, sub-blocks in the cell disassembly unit 74 are also connected with control bus.

Further, the data bus width in the ATM circuit interface unit 64 and STM circuit interface unit 62 is serial (1 bit), but in the cell assembly and disassembly device 61, generally, data is exchanged in the width of 8 bits. For example, when the ATM interface speed is 155.52 MHz, inside the cell assembly and disassembly device 61, as mentioned above, the interface is 8-bit wide, and most of the parts operate in the clock of the ATM interface system, and therefore the internal basic clock is 19.44 MHz (=155.52 MHz/8 bits).

The operation of the conventional cell assembly and disassembly device 61 will now be explained. The STM circuit interface 72 shown in FIG. 27 converts the bit row received from the STM circuit interface 62 from serial to parallel (8 bits), extracts the frame boundary and time slot, and transmits all data, together with the timing information, to the cell assembly unit 73. The cell assembly unit 73 assembles only the effective data in a cell of a format shown in FIG. 28 in every destination (virtual path 65) according to the instruction (to assign the data from which time slot into which virtual path 65) from a TS/VP conversion table not shown in the diagram, and transmits to the ATM circuit interface unit 71. The ATM circuit interface unit 71 inserts the cell received from the cell assembly unit 73 into the payload of physical layer frame such as SDH (synchronous digital hierarchy) or SONET (synchronous optical network), converts from parallel to serial, and transmits to the ATM circuit interface 64.

Similarly, as a flow in reverse direction, the ATM circuit interface unit 71 converts the bit row received from the ATM circuit interface 64 from serial to parallel, processes the physical layer by detecting cell synchronism or the like, and transmits all effective extracted cells together with timing information to the cell disassembly unit 74.

The AAL1 processor 81 in the cell disassembly unit 74 shown in FIG. 29 extracts the VPI from the header of the received cell, notices it to the write controller 83, and analyzes the sequence number in the AAL1 header, and detects cell discarding and insertion of wrong cell. When cell discarding is detected, in this case, the lost data is compensated (inserting all-1 pattern of 46 bytes if the discarded cell is supposed to be P format, or 47 bytes in the case of non-P format), and further when the discarded cell is supposed to be P format, the frame boundary information is also predicted and compensated. When a wrong cell insertion is detected, the wrong inserted cell is discarded. Later, the information extracted from the payload of the received cell and frame boundary information are transmitted to the fluctuation absorption buffer unit 82.

The write controller 83 analyzes the VPI received from the AAL1 processor 81, judges the sender (virtual path 65), generates a corresponding write signal, and transmits to the fluctuation absorption buffer unit 82 and buffer monitor unit 84. In FIG. 30, the fluctuation absorption buffer unit 82 stores, according to the write signal received from the write controller 83, the data and frame boundary information received from the AAL1 processor 81 temporarily in the individual buffers VPB1 to VPBm prepared in each virtual path 65 (VPI#1 to #m).

The buffer monitor unit 84 monitors the data accumulated amount held in the cell buffer 92 in every individual buffers VPB1 to VPBm, from the write signal from the write controller 83 and read signal from the read controller 85, and controls the operation of the write controller 83 and read controller 85 according to the result. For example, the data accumulating amount in the individual buffers VPB1 to VPBm which are empty upon start of communication gradually increases by turning on the write action instruction and turning off the read action instruction until reaching the reading-start thresholds VPTH1 to VPTHm by write action, and when the data accumulated amount reaches the reading-start thresholds VPTH1 to VPTHm, the read action instruction is also turned on sequentially.

The read controller 85, when the reading-start instruction from the buffer monitor unit 84 is ON, generates read signals to be distributed correctly into the time slots in which read data is distributed, and transmits to the fluctuation absorption buffer unit 82, according to the instruction (to assign the data from which virtual path 65 into which time slot time slot) from the VP/TS conversion table 86, frame boundary information from the fluctuation absorption buffer 82, and timing information from the STM circuit interface unit 72.

The VP/TS conversion table 86 stores the corresponding relation of the virtual path 65 (VPI) and time slot, that is, the information showing which virtual path 65 is set (which VPI is present), and which time slot is used by each virtual path 65, and notices the information to the read controller 85. The STM circuit interface unit 72 inserts the data being readout by the read controller 85 into the payload (time slot) of the physical layer frame, converts from parallel into serial, and transmits to the STM circuit interface 62.

Thus, in the conventional method, the received data and frame boundary information are once held in the cell buffer 92 in the fluctuation absorption buffer 82, and by stopping the reading action (delaying the reading-start timing) until the data accumulated amount reaches the reading-start threshold after start of communication, delay fluctuations occurring during cell transfer in the ATM network 63 is absorbed, and the continuity of the data issued to the STM circuit interface 62 is assured.

Herein, the reading-start thresholds VPTH1 to VPTHm of individual buffers VPB1 to VPBm can be basically expressed with the following equation (1), supposing the maximum of the delay fluctuation determined as the characteristic of the ATM network 63 to be ±D and the communication speed of the virtual path 65 accommodated to be V (identifier k=1 to m).

$$VPTHk = Vk \times D \qquad (1)$$

The capacity Lk (identifier k=1 to m) required as individual buffers VPB1 to VPBm can be basically expressed with the following equation (2).

$$Lk = 2 \times VPTHk = 2 X Vk \times D \qquad (2)$$

However, since the received data is written into the cell buffer 82 in cell unit, if the calculation result in equation 1 is 47 bytes (worth 1 cell) or less, it is general to express as follows.

$$VPTHk = 48 \text{ bytes (1 cell+1 byte)} \qquad (3)$$

$$Lk = 94 \text{ bytes (2 cells)} \qquad (4)$$

As shown in equation (2), the capacity L (capacity L1 to Lm) of individual buffers VPB1 to VPBm used as fluctuation absorption buffers basically depends on the communication speed of the virtual buffer accommodated. Accordingly, in the conventional cell assembly and disassembly device 61, the cell buffer 92 is realized mainly by the following two methods, that is, the individual memory method and common memory method.

In the individual memory method, one memory is divided into plural fixed banks, and the banks are used as individual buffers VPB1 to VPBm, or plural individual memories are prepared physically, and used as individual buffers VPB1 to VPBm.

In this method, since the individual buffers VPB1 to VPBm are composed of simple first-in first-out (FIFO) memories, the memory control circuit is simple. However, so as to be flexibly applicable to completely different communication speeds in individual virtual paths 65, capacities of all individual buffers VPB1 to VPBm must conform to the maximum communication speed of the STM circuit interface 62, for example, in the case of the ISDN (integrated services digital network) temporary group speed interface, the capacity must be large enough to accommodate the speed of 1.536 Mb/s, and this is the simplest configuration and the memory control circuit is the easiest, but the total memory capacity becomes extremely large.

Accordingly, it has been attempted to curtail the total memory capacity by providing the applicable communication speed with limiting conditions and making use of the regularity of the communication speeds in the limiting conditions. For example, in the limiting conditions "to be applicable to maximum speed and communication speed to the power of 2 of 64 kb/s only," the memory capacity of individual buffers VPB1 to VPBm is composed of 1 for 1.536 Mb/s+2 for 512 kb/s+3 for 256 kb/s+6 for 128 kb/s+12 for 64 kb/s. In spite of such curtailing means, however, the cell buffer 92 cannot be realized at the minimum memory cost in this method. Features of this method are briefly summarized as follows.

Merit: Memory control circuit is simple.

Demerit: Total memory capacity is very large.

On the other hand, in the common memory method, one memory is finely divided into cell levels (for example, in the units of 64 bytes each), and obtained memory blocks are commonly shared by all virtual paths 65, and in each virtual path 65 as required, plural memory blocks are occupied sequentially, and combined in chain, so that the individual buffers VPB1 to VPBm are realized.

This method is flexibly applicable to various communication speeds, and requires only a minimum limit of total memory capacity because the memory is shared, but the demerit is that the memory control circuit is very complicated as disclosed, for example, in Japanese Laid-open Patent No. 8-331149. The total memory capacity (common memory capacity) Ls required in this method may be basically expressed with the following equation (5), supposing the maximum communication speed of the STM circuit interface 62 to be Vmax.

$$Ls = 2 \times V\text{max} \times D \qquad (5)$$

Features of this method are briefly summarized as follows.

Merit: Total memory capacity is small.

Demerit: Memory control circuit is extremely complicated.

According to the prior art, however, since fluctuations are absorbed by the buffer of which capacity depends on the virtual path which is variable in communication speed, if attempted to curtail the total capacity of the memory for absorbing fluctuations, the memory control circuit is complicated and the cost is increased, or if attempted to simplify the memory control circuit, the total capacity of the memory for absorbing fluctuations becomes large, and the cost is increased, too.

It is an object of this invention to provide a cell disassembly device capable of suppressing both increase of total capacity of cell for absorbing fluctuations and complication of memory control circuit. It is also an object of this invention to provide a cell disassembly method and a computer-readable recording medium which records a computer program that realizes the method according to this invention on a computer.

DISCLOSURE OF THE INVENTION

The cell disassembly device according to this invention comprises a cell disassembly unit which disassembles a cell received from an ATM circuit interface, extracts data from payload, distributing data in plural time slots divided and multiplexed in time in frame period according to a sender (virtual path), and sends out to an STM circuit interface; and a buffer provided in each time slot, wherein the cell disassembly unit stores the data distributed in each time slot temporarily in the buffer, and absorbs fluctuations of the cell.

According to the above-mentioned cell disassembly device, the cell disassembly unit stores the data distributed in each time slot temporarily in the buffer provided in each time slot, and absorbs fluctuations of the cell. Therefore, fluctuations can be absorbed in each time slot constant in communication speed, and the capacity of each buffer is always enough at the minimum capacity (the capacity enough to accommodate communication speed in each time slot) regardless of the communication speed of virtual path, and the memory is composed in a simple structure.

In the cell disassembly device according to another aspect of this invention, the cell disassembly unit accumulates data after start of communication by writing data distributed in each time slot into the buffer, reads out the data from the buffer, parallel to writing, when the data accumulated amount in the buffer reaches a prescribed amount, and sends out the read data to the STM circuit interface.

According to the above-mentioned cell disassembly device, the cell disassembly unit accumulates data after start of communication by writing data distributed in each time slot into the buffer, reads out the data from the buffer, parallel to writing, when the data accumulated amount in the buffer reaches a prescribed amount, and sends out the read data to the STM circuit interface. Therefore, fluctuations can be absorbed in a simple procedure.

In the cell disassembly device according to still another aspect of this invention, the cell disassembly unit accumulates data after start of communication by writing data distributed in each time slot into the buffer, reads out the data from the buffer, parallel to writing, when passing a first prescribed time, and sends out the read data to the STM circuit interface.

According to the above-mentioned cell disassembly device, the cell disassembly unit accumulates data after start of communication by writing data distributed in each time slot into the buffer, reads out the data from the buffer, parallel to writing, when passing a first prescribed amount, and sends out the read data to the STM circuit interface. Therefore, fluctuations can be absorbed in a simple procedure.

The cell disassembly device according to still another aspect of this invention further comprises a setting unit which sets the prescribed amount or first prescribed time.

According to the above-mentioned cell disassembly device, the prescribed amount or first prescribed time can be set by the setting unit. Therefore, the prescribed amount or first prescribed time can be adjusted depending on the environments of use.

The cell disassembly device according to still another aspect of this invention further comprises a measuring unit which measures fluctuations of the cell, in which the setting unit sets the value of the prescribed amount or first prescribed time on the basis of the result of measurement by the measuring unit.

According to the above-mentioned cell disassembly device, the measuring unit measures fluctuations of the cell, and the setting unit sets the value of the prescribed amount or first prescribed time on the basis of the result of measurement by the measuring unit. Therefore, the prescribed amount or first prescribed time can be adjusted automatically and appropriately.

In the cell disassembly device according to still another aspect of this invention, the prescribed amount or first prescribed time is present independently in each buffer, and the cell disassembly unit determines the reading-start timing from the buffer independently in each buffer.

According to the above-mentioned cell disassembly device, the prescribed amount or first prescribed time is present independently in each buffer, and the cell disassembly unit determines the reading-start timing from the buffer independently in each buffer, and therefore the reading-start timing can be controlled finely in each buffer.

In the cell disassembly device according to still another aspect of this invention, the prescribed amount or first prescribed time is present independently in each virtual path, and the cell disassembly unit determines the reading-start timing from the buffer independently in every one or two or more buffers corresponding to each virtual path.

According to the above-mentioned cell disassembly device, the prescribed amount or first prescribed time is present independently in each virtual path, and the cell disassembly unit determines the reading-start timing from the buffer independently in every one or two or more buffers corresponding to each virtual path, and therefore it is higher in probability that the data to be issued in a same frame is actually issued in the same frame.

In the cell disassembly device according to still another aspect of this invention, the cell disassembly unit starts reading action from all buffers corresponding to the virtual path when the data accumulated amount reaches the prescribed amount or passing the prescribed first time from start of communication, in more than a specified number of buffers out of one or two or more buffers corresponding to a same virtual path.

According to the above-mentioned cell disassembly device, the cell disassembly unit starts reading action from all buffers corresponding to the virtual path when the data accumulated amount reaches the prescribed amount or passing the prescribed first time from start of communication, in more than a specified number, for example, one or more of buffers out of one or two or more buffers corresponding to a same virtual path. Therefore, in a simple method, the reading-start timing in every one or two or more buffers corresponding to each virtual path can be controlled.

In the cell disassembly device according to still another aspect of this invention, the cell disassembly unit starts reading action from all buffers corresponding to the virtual path when the data accumulated amount reaches the prescribed amount or passing the prescribed first time from start of communication, in all buffers out of one or two or more buffers corresponding to a same virtual path.

According to the above-mentioned cell disassembly device, the cell disassembly unit starts reading action from all buffers corresponding to the virtual path when the data accumulated amount reaches the prescribed amount or passing the prescribed first time from start of communication, in all buffers out of one or two or more buffers corresponding to a same virtual path, and therefore, in a simple method, the reading-start timing in every one or two or more buffers corresponding to each virtual path can be controlled.

In the cell disassembly device according to still another aspect of this invention, the cell disassembly unit once stops, when an underflow occurs in the buffer, reading out from the buffer having the underflow, and resumes reading out when the data accumulated amount reaches again the prescribed amount or passing a second prescribed time after occurrence of underflow.

According to the above-mentioned cell disassembly device, the cell disassembly unit once stops, when an underflow occurs in the buffer, reading out from the buffer having the underflow, and resumes reading out when the data accumulated amount reaches again the prescribed amount or passing a second prescribed time after occurrence of underflow, and therefore if an underflow occurs, a normal communication can be recovered promptly.

In the cell disassembly device according to still another aspect of this invention, the cell disassembly unit, when an underflow occurs in any one of one or two or more buffers corresponding to a same virtual path, resets all buffers corresponding to this virtual path, and once stops writing and reading in these buffers, and resumes writing so that the data belonging to a same frame period may be accumulated uniformly at the beginning of these buffers, and resumes reading out when the data accumulated amount in these buffers reaches again the prescribed amount or passing a second prescribed time after execution of resetting.

According to the above-mentioned cell disassembly device, the cell disassembly unit, when an underflow occurs in any one of one or two or more buffers corresponding to a same virtual path, resets all buffers corresponding to this virtual path, and once stops writing and reading in these buffers, and resumes writing so that the data belonging to a same frame period may be accumulated uniformly at the beginning of these buffers, and resumes reading out when the data accumulated amount in these buffers reaches again the prescribed amount or passing a second prescribed time after execution of resetting, and therefore if an underflow occurs, a normal communication can be recovered promptly.

In the cell disassembly device according to still another aspect of this invention, the cell disassembly unit resets, when an overflow occurs in the buffer, the buffer having the overflow, once stops reading out from this buffer, and resumes reading out when the data accumulated amount reaches again the prescribed amount or passing a second prescribed time after execution of resetting.

According to the above-mentioned cell disassembly device, the cell disassembly unit resets, when an overflow occurs in the buffer, the buffer having the overflow, once stops reading out from this buffer, and resumes reading out when the data accumulated amount reaches again the prescribed amount or passing a second prescribed time after execution of resetting, and therefore if an overflow occurs, a normal communication can be recovered promptly.

In the cell disassembly device according to still another aspect of this invention, the cell disassembly unit, when an overflow occurs in any one of one or two or more buffers corresponding to a same virtual path, resets all buffers corresponding to this virtual path, and once stops writing and reading in these buffers, and resumes writing so that the data belonging to a same frame period may be accumulated uniformly at the beginning of these buffers, and resumes reading out when the data accumulated amount in these buffers reaches again the prescribed amount or passing a second prescribed time after execution of resetting.

According to the above-mentioned cell disassembly device, the cell disassembly unit, when an overflow occurs in any one of one or two or more buffers corresponding to a same virtual path, resets all buffers corresponding to this virtual path, and once stops writing and reading in these buffers, and resumes writing so that the data belonging to a same frame period may be accumulated uniformly at the beginning of these buffers, and resumes reading out when the data accumulated amount in these buffers reaches again the prescribed amount or passing a second prescribed time after execution of resetting, and therefore if an overflow occurs, a normal communication can be recovered promptly.

In the cell disassembly device according to still another aspect of this invention, the cell disassembly unit once stops, when an overflow occurs in the buffer, writing into the buffer having the overflow, and resumes writing when the data accumulated amount in this buffer decreases to the prescribed amount or passing a second prescribed time after occurrence of overflow.

According to the above-mentioned cell disassembly device, the cell disassembly unit once stops, when an overflow occurs in the buffer, writing into the buffer having the overflow, and resumes writing when the data accumulated amount in this buffer decreases to the prescribed amount or passing a second prescribed time after occurrence of overflow, and therefore if an overflow occurs, a normal communication can be recovered promptly.

In the cell disassembly device according to still another aspect of this invention, the cell disassembly unit, when an overflow occurs in any one of one or two or more buffers corresponding to a same virtual path, once stops writing in all buffers corresponding to this virtual path, and resumes writing when the data accumulated amount in these buffers decreases again to the prescribed amount or passing a second prescribed time after occurrence of overflow.

According to the above-mentioned cell disassembly device, the cell disassembly unit once stops, when an overflow occurs in the buffer, writing into the buffer having the overflow, and resumes writing when the data accumulated amount in this buffer decreases to the prescribed amount or passing a second prescribed time after occurrence of overflow, and therefore if an overflow occurs, a normal communication can be recovered promptly, and therefore if an overflow occurs, a normal communication can be recovered promptly.

The cell disassembly device according to still another aspect of this invention further comprises an increasing or extending unit which increases the prescribed amount or extends the second prescribed time when an underflow occurs in the buffer.

According to the above-mentioned is cell disassembly device, the increasing or extending unit increases the prescribed amount or extends the second prescribed time when an underflow occurs in the buffer. Therefore, recurrence of underflow can be automatically decreased.

The cell disassembly device according to still another aspect of this invention further comprises an increasing or extending unit which increases the prescribed amount or extends the second prescribed time when an overflow occurs in the buffer.

According to the above-mentioned cell disassembly device, the increasing or extending unit increases the prescribed amount or extends the second prescribed time when an overflow occurs in the buffer. Therefore, recurrence of underflow can be automatically decreased.

The cell disassembly method according to still another aspect of this invention is a cell disassembly method for disassembling a cell received from an ATM circuit interface, extracting data from payload, distributing data in plural time slots divided and multiplexed in time in frame period according to a sender (virtual path), and sending out to an STM circuit interface, comprising the step of storing the data distributed in each time slot temporarily in a buffer provided in each time slot, and absorbing fluctuations of the cell.

According to the above-mentioned cell disassembly method, the storing step stores the data distributed in each time slot temporarily in the buffer provided in each time slot, and absorbs fluctuations of the cell. Therefore, fluctuations can be absorbed in each time slot constant in communication speed, and the capacity of each buffer is always enough at the minimum capacity (the capacity enough to accommodate communication speed in each time slot) regardless of the communication speed of virtual path, and the memory is composed in a simple structure.

In the cell disassembly method according to still another aspect of this invention, the storing step comprises a step of accumulating data after start of communication by writing data distributed in each time slot into the buffer, a step of reading out the data from the buffer, parallel to writing, when the data accumulated amount in the buffer at the accumulating step reaches a prescribed amount, and a step of sending out the read data to the STM circuit interface.

According to the above-mentioned cell disassembly method, the accumulating step accumulates data after start of communication by writing data distributed in each time slot into the buffer, the reading and writing step reads out the data from the buffer, parallel to writing, when the data accumulated amount in the buffer at the accumulating step reaches a prescribed amount, and the sending step sends out the read data to the STM circuit interface. Therefore, fluctuations can be absorbed in a simple procedure.

In the cell disassembly method according to still another aspect of this invention, the storing step comprises a step of accumulating data after start of communication by writing data distributed in each time slot into the buffer, a step of reading out the data from the buffer, parallel to writing, when data is accumulated at the accumulating step for a first prescribed time, and a step of sending out the read data to the STM circuit interface.

According to the above-mentioned cell disassembly method, the accumulating step accumulates data after start of communication by writing data distributed in each time slot into the buffer, the reading and writing step reads out the data from the buffer, parallel to writing, when the data is accumulated at the accumulating step for a first prescribed amount, and the sending step sends out the read data to the STM circuit interface. Therefore, fluctuations can be absorbed in a simple procedure.

The cell disassembly method according to still another aspect of this invention further comprises a step of setting the prescribed amount or first prescribed time.

According to the above-mentioned cell disassembly method, the prescribed amount or first prescribed time can be set at the setting step. Therefore, the prescribed amount or first prescribed time can be adjusted depending on the environments of use.

The cell disassembly method according to still another aspect of this invention further comprises a step of measuring fluctuations of the cell, in which the setting step sets the value of the prescribed amount or first prescribed time on the basis of the result of measurement at the measuring step.

According to the above-mentioned cell disassembly method, the measuring step measures fluctuations of the cell, and the setting step sets the value of the prescribed amount or first prescribed time on the basis of the result of measurement at the measuring step. Therefore, the prescribed amount or first prescribed time can be adjusted automatically and appropriately.

In the cell disassembly method according to still another aspect of this invention, the prescribed amount or first prescribed time is present independently in each buffer, and the reading and writing step determines the reading-start timing from the buffer independently in each buffer.

According to the above-mentioned cell disassembly method, the prescribed amount or first prescribed time is present independently in each buffer, and the reading and writing step determines the reading-start timing from the buffer independently in each buffer, and therefore the reading-start timing can be controlled finely in each buffer.

In the cell disassembly method according to still another aspect of this invention, the prescribed amount or first prescribed time is present independently in each virtual path, and the reading and writing step determines the reading-start timing from the buffer independently in every one or two or more buffers corresponding to each virtual path.

According to the above-mentioned cell disassembly method, the prescribed amount or first prescribed time is present independently in each virtual path, and the reading and writing step determines the reading-start timing from the buffer independently in every one or two or more buffers corresponding to each virtual path, and therefore it is higher in probability that the data to be issued in a same frame is actually issued in the same frame.

In the cell disassembly method according to still another aspect of this invention, the reading and writing step starts reading action from all buffers corresponding to the virtual path when the data accumulated amount reaches the prescribed amount or passing the prescribed first time from start of communication, in more than a specified number of buffers out of one or two or more buffers corresponding to a same virtual path.

According to the above-mentioned cell disassembly method, the reading and writing step starts reading action from all buffers corresponding to the virtual path when the data accumulated amount reaches the prescribed amount or passing the prescribed first time from start of communication, in more than a specified number, for example, one or more of buffers out of one or two or more buffers corresponding to a same virtual path. Therefore, in a simple method, the reading-start timing in every one or two or more buffers corresponding to each virtual path can be controlled.

In the cell disassembly method according to still another aspect of this invention, the reading and writing step starts reading action from all buffers corresponding to the virtual path when the data accumulated amount reaches the prescribed amount or passing the prescribed first time from start of communication, in all buffers out of one or two or more buffers corresponding to a same virtual path.

According to the above-mentioned cell disassembly method, the reading and writing step starts reading action from all buffers corresponding to the virtual path when the data accumulated amount reaches the prescribed amount or passing the prescribed first time from start of communication, in all buffers out of one or two or more buffers corresponding to a same virtual path, and therefore, in a simple method, the reading-start timing in every one or two or more buffers corresponding to each virtual path can be controlled.

In the cell disassembly method according to still another aspect of this invention, the reading and writing step once stops, when an underflow occurs in the buffer, reading out from the buffer having the underflow, and resumes reading out when the data accumulated amount reaches again the prescribed amount or passing a second prescribed time after occurrence of underflow.

According to the above-mentioned cell disassembly method, the reading and writing step once stops, when an underflow occurs in the buffer, reading out from the buffer having the underflow, and resumes reading out when the data accumulated amount reaches again the prescribed amount or passing a second prescribed time after occurrence of underflow, and therefore if an underflow occurs, a normal communication can be recovered promptly.

In the cell disassembly method according to still another aspect of this invention, the reading and writing step, when an underflow occurs in any one of one or two or more buffers corresponding to a same virtual path, resets all buffers corresponding to this virtual path, and once stops writing and reading in these buffers, and resumes writing so that the data belonging to a same frame period may be accumulated uniformly at the beginning of these buffers, and resumes reading out when the data accumulated amount in these buffers reaches again the prescribed amount or passing a second prescribed time after execution of resetting.

According to the above-mentioned cell disassembly method, the reading and writing step, when an underflow occurs in any one of one or two or more buffers corresponding to a same virtual path, resets all buffers corresponding to this virtual path, and once stops writing and reading in these buffers, and resumes writing so that the data belonging to a same frame period may be accumulated uniformly at the beginning of these buffers, and resumes reading out when the data accumulated amount in these buffers reaches again the prescribed amount or passing a second prescribed time after execution of resetting, and therefore if an underflow occurs, a normal communication can be recovered promptly.

In the cell disassembly method according to still another aspect of this invention, the reading and writing step resets, when an overflow occurs in the buffer, the buffer having the overflow, once stops reading out from this buffer, and resumes reading out when the data accumulated amount reaches again the prescribed amount or passing a second prescribed time after execution of resetting.

According to the above-mentioned cell disassembly method, the reading and writing step resets, when an overflow occurs in the buffer, the buffer having the overflow, once stops reading out from this buffer, and resumes reading out when the data accumulated amount reaches again the prescribed amount or passing a second prescribed time after execution of resetting, and therefore if an overflow occurs, a normal communication can be recovered promptly.

In the cell disassembly method according to still another aspect of this invention, the reading and writing step, when an overflow occurs in any one of one or two or more buffers corresponding to a same virtual path, resets all buffers corresponding to this virtual path, and once stops writing and reading in these buffers, and resumes writing so that the data belonging to a same frame period may be accumulated uniformly at the beginning of these buffers, and resumes reading out when the data accumulated amount in these buffers reaches again the prescribed amount or passing a second prescribed time after execution of resetting.

According to the above-mentioned cell disassembly method, the reading and writing step, when an overflow occurs in any one of one or two or more buffers corresponding to a same virtual path, resets all buffers corresponding to this virtual path, and once stops writing and reading in these buffers, and resumes writing so that the data belonging to a same frame period may be accumulated uniformly at the beginning of these buffers, and resumes reading out when the data accumulated amount in these buffers reaches again the prescribed amount or passing a second prescribed time after execution of resetting, and therefore if an overflow occurs, a normal communication can be recovered promptly.

In the cell disassembly method according to still another aspect of this invention, the reading and writing step once stops, when an overflow occurs in the buffer, writing into the buffer having the overflow, and resumes writing when the data accumulated amount in this buffer decreases to the prescribed amount or passing a second prescribed time after occurrence of overflow.

According to the above-mentioned cell disassembly method, the reading and writing step once stops, when an overflow occurs in the buffer, writing into the buffer having the overflow, and resumes writing when the data accumulated amount in this buffer decreases to the prescribed amount or passing a second prescribed time after occurrence of overflow, and therefore if an overflow occurs, a normal communication can be recovered promptly.

In the cell disassembly method according to still another aspect of this invention, the reading and writing step, when an overflow occurs in any one of one or two or more buffers corresponding to a same virtual path, once stops writing in all buffers corresponding to this virtual path, and resumes writing when the data accumulated amount in these buffers decreases again to the prescribed amount or passing a second prescribed time after occurrence of overflow.

According to the above-mentioned cell disassembly method, the reading and writing step once stops, when an overflow occurs in the buffer, writing into the buffer having the overflow, and resumes writing when the data accumulated amount in this buffer decreases to the prescribed amount or passing a second prescribed time after occurrence of overflow, and therefore if an overflow occurs, a normal communication can be recovered promptly, and therefore if an overflow occurs, a normal communication can be recovered promptly.

The cell disassembly method according to still another aspect of this invention further comprises an increasing or extending step of increasing the prescribed amount or extending the second prescribed time when an underflow occurs in the buffer.

According to the above-mentioned cell disassembly method, the increasing or extending step increases the prescribed amount or extends the second prescribed time when an underflow occurs in the buffer. Therefore, recurrence of underflow can be automatically decreased.

The cell disassembly method according to still another aspect of this invention further comprises an increasing or extending step of increasing the prescribed amount or extending the second prescribed time when an overflow occurs in the buffer.

According to the above-mentioned cell disassembly method, the increasing or extending step increases the prescribed amount or extends the second prescribed time when an overflow occurs in the buffer. Therefore, recurrence of overflow can be automatically decreased.

In the cell disassembly method according to still another aspect of this invention, the second prescribed time is a first prescribed time.

According to the above-mentioned cell disassembly method, a same prescribed time can be defined for the first prescribed time and second prescribed time. Therefore, in the event of overflow or underflow, when the second prescribed time is extended, the first prescribed time is also extended.

The computer-readable recording medium according to still another aspect of this invention stores a computer program that causes a computer to execute the method according to this invention.

According to the above-mentioned computer-readable recording medium, since the method of the invention can be executed by the computer, both increase of total capacity of the memory for absorbing fluctuations and complication of memory control circuit can be suppressed, so that the cost can be reduced.

BEST MODE FOR CARRYING OUT THE INVENTION

Figure 1:
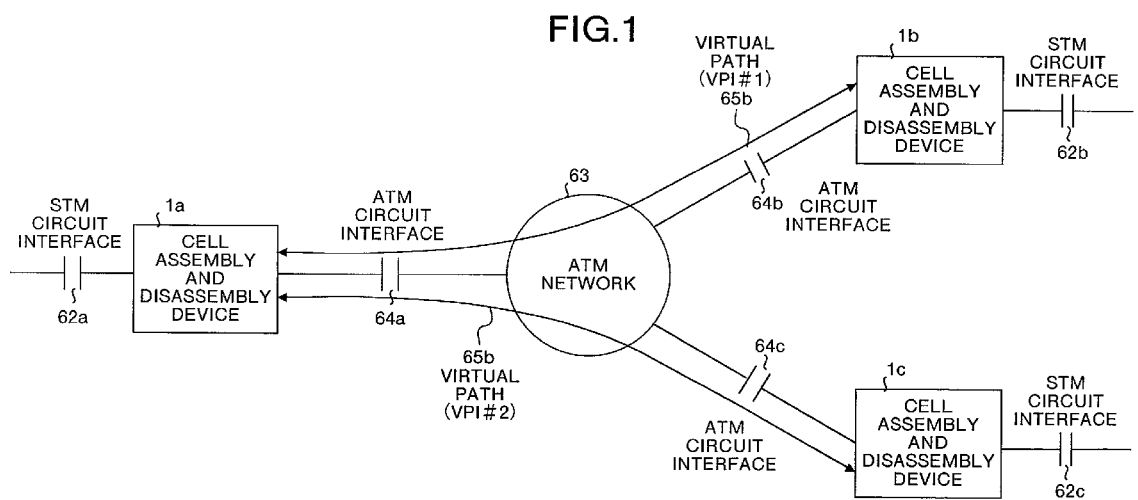
FIG. 1 is a block diagram showing a system for transmitting and receiving data on STM circuit through ATM network by means of a cell assembly and disassembly device in a first embodiment of the invention.

Referring now to the drawings, preferred embodiments of a cell disassembly device, a cell disassembly method, and a computer-readable recording medium recording a program for executing this method by a computer according to the invention are described specifically below. It must be noted, however, that the invention is not limited to these embodiments alone.

A cell disassembly device in the first embodiment is a cell assembly and disassembly device comprising buffers provided in each time slot for storing data distributed in each time slot temporarily, and absorbing delay fluctuations occurring in cell transfer in ATM network, multiplexing fluctuations occurring in cell transfer, and other cell fluctuations (sometimes merely called fluctuations hereafter).

Figure 26:
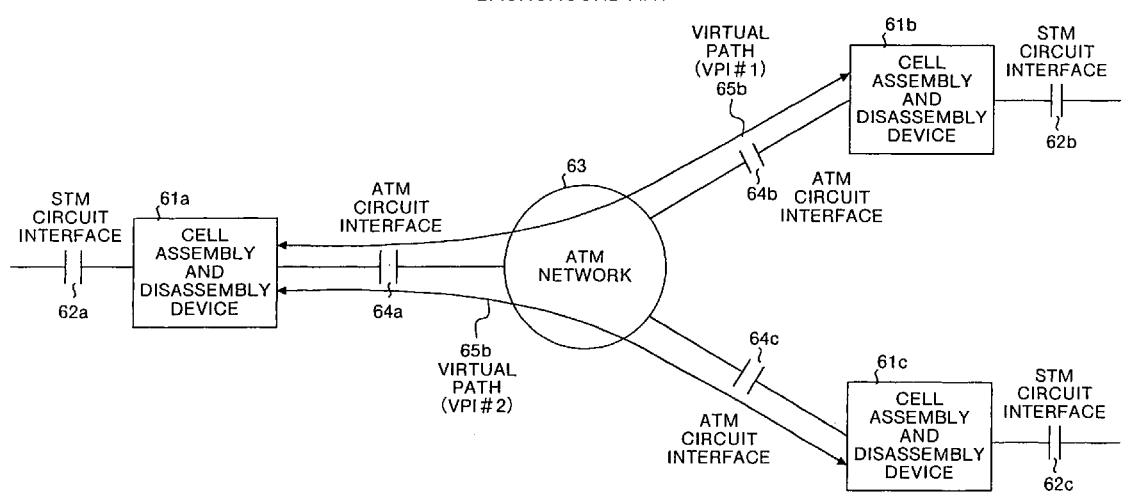
FIG. 26 is a functional block diagram showing a system for transmitting and receiving data on STM circuit through ATM network by means of a cell assembly and disassembly device in a prior art.

FIG. 1 is a block diagram showing a system for transmitting and receiving data on STM circuit through ATM network by means of a cell assembly and disassembly device in the first embodiment of the invention. Same parts as in FIG. 26 are identified with same reference numerals, and their explanation is omitted. In the system shown in FIG. 1, instead of the conventional cell assembly and disassembly devices 61a, 61b, and 61c shown in FIG. 26, cell assembly and disassembly devices 1a, 1b, and 1c of the first embodiment are disposed.

Figure 2:
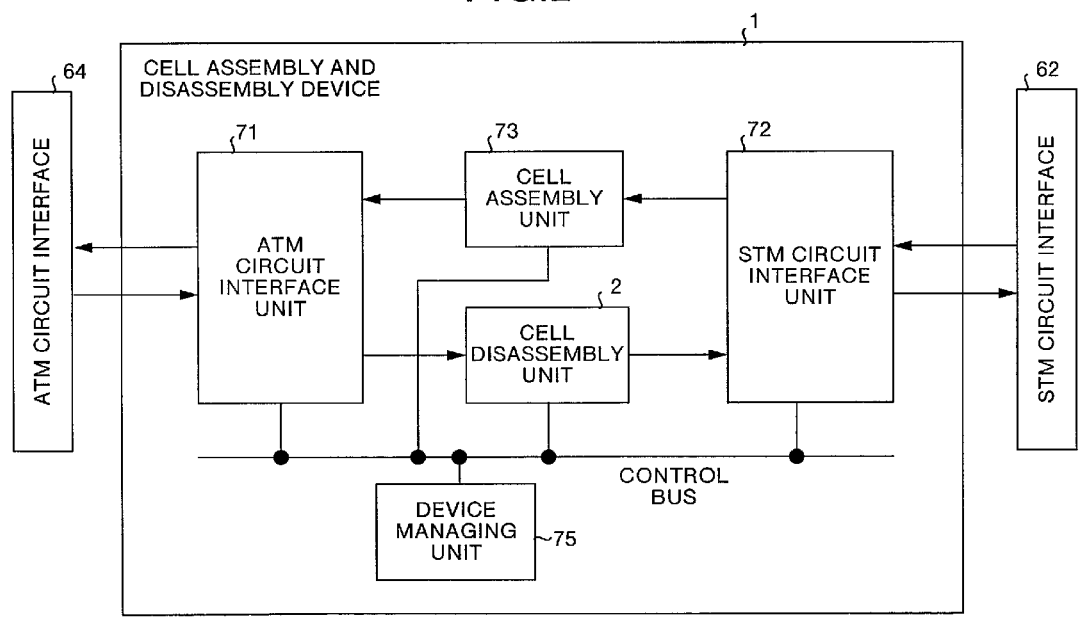
FIG. 2 is a functional block diagram showing a configuration of the cell assembly and disassembly device in the first embodiment of the invention.
Figure 27:
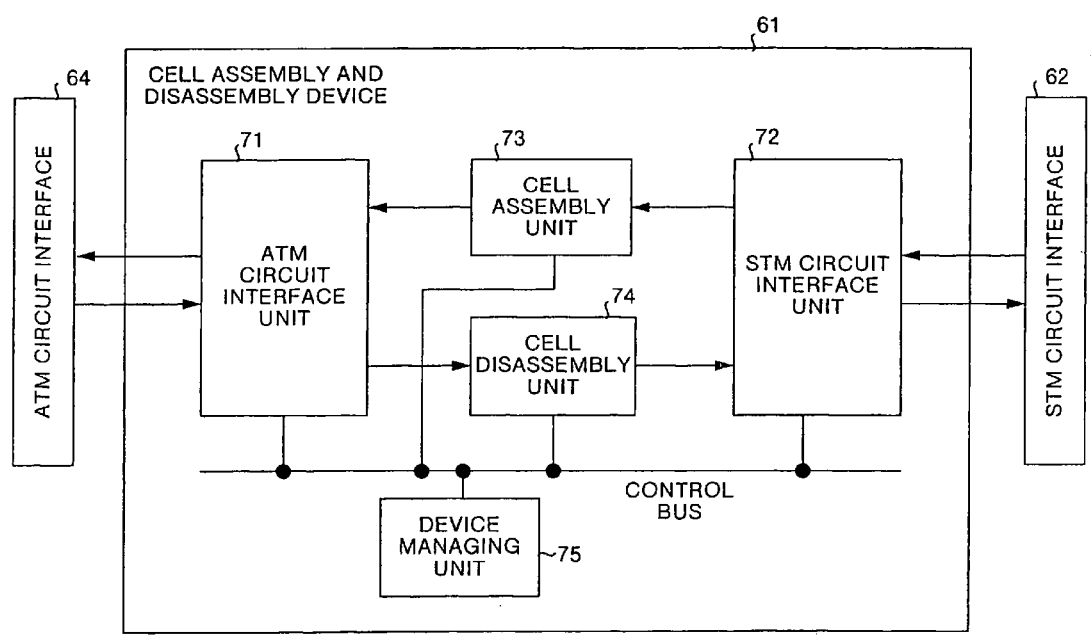
FIG. 27 is a functional block diagram showing a configuration of the conventional cell assembly and disassembly device shown in FIG. 26.

FIG. 2 is a functional block diagram showing a configuration of the cell assembly and disassembly device 1 (cell assembly and disassembly device 1a, 1b, or 1c) in the first embodiment of the invention. Same parts as in FIG. 27 are identified with same reference numerals, and their explanation is omitted. The cell assembly and disassembly device 1 has a cell disassembly unit 2 of the first embodiment instead of the cell disassembly unit 74 of the conventional cell assembly and disassembly device 61.

Figure 3:
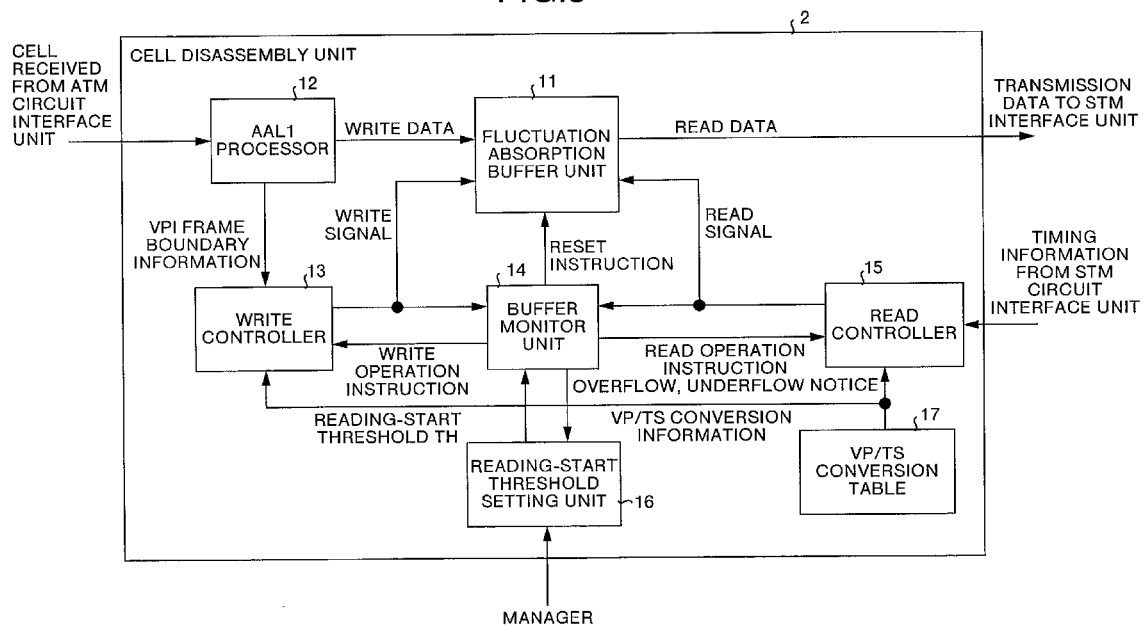
FIG. 3 is a functional block diagram showing a configuration of cell disassembly unit in the first embodiment shown in FIG. 2.

FIG. 3 is a functional block diagram showing a configuration of the cell disassembly unit 2 in the first embodiment shown in FIG. 2. The cell disassembly unit 2 comprises an AAL1 processor 12 for extracting the VPI, frame boundary information and data from the received cell, and transmitting the VPI and frame boundary information to a write controller 13 and data to a fluctuation absorption buffer unit 11, the fluctuation absorption buffer unit 11 for temporarily storing the data extracted from the payload of the received cell separately in each time slot (TS), and absorbing the fluctuation, the write controller 13 for analyzing the received VPI, judging the sender (virtual path 65), and generating a write signal to the fluctuation absorption buffer unit 11 on the basis the result and frame boundary information, a buffer monitor unit 14 for monitoring the data accumulated amount in the fluctuation absorption buffer unit 11 in every time slot (TS), and controlling the operation of the write controller 13, read controller 15, and fluctuation absorption buffer unit 11 on the basis the result and the reading-start threshold from a reading-start threshold setting unit 16, the read controller 15 for reading out the data from the fluctuation absorption buffer unit 11 according to the timing information from the STM circuit interface unit 72 and distributing into necessary time slots, the reading-start threshold setting unit 16 for noticing the reading-start threshold used in control of the timing for starting reading (reading-start timing) from a buffer 22 described below to the buffer monitor unit 14, and a VP/TS conversion table 17 for storing the corresponding relation of the virtual path 65 and distribution time slots, and noticing to the write controller 13 and read controller 15.

Figure 28:
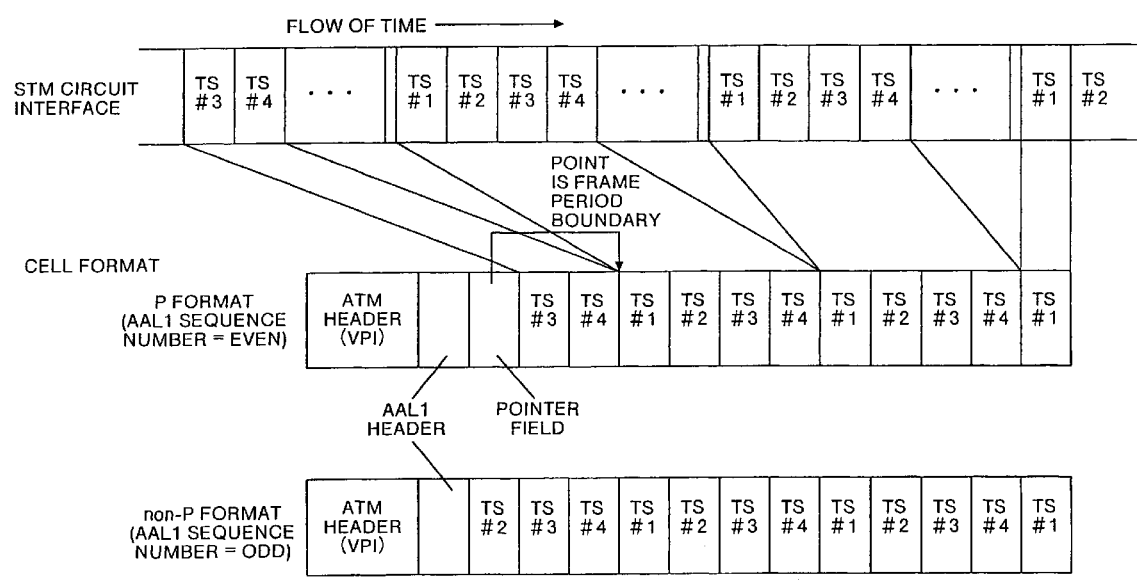
FIG. 28 is an explanatory diagram showing a cell format used in a conventional structured data transfer method.
Figure 29:
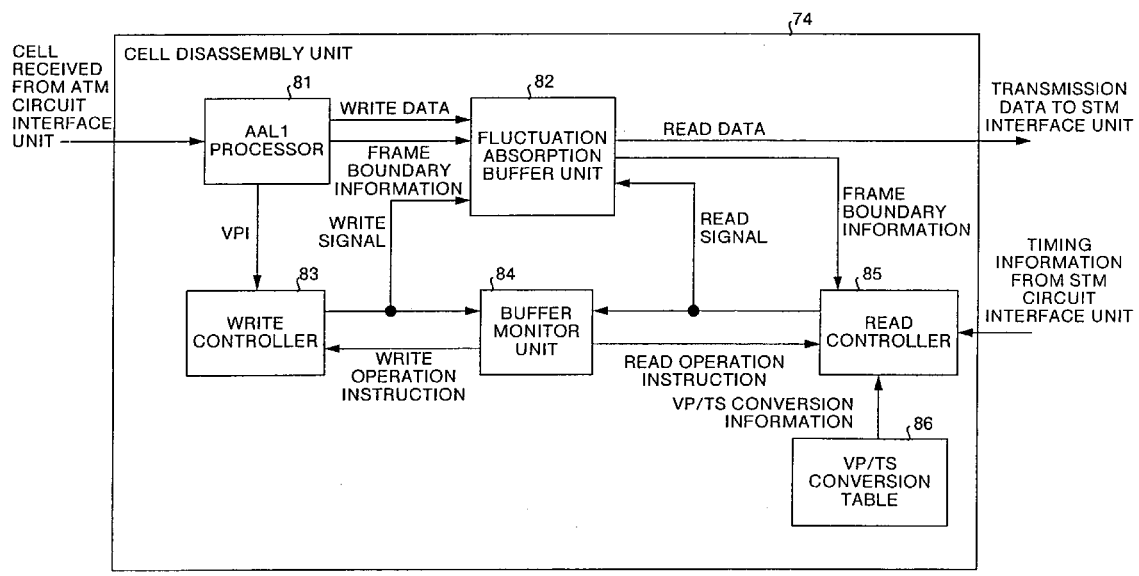
FIG. 29 is a functional block diagram showing a configuration of a conventional cell disassembly unit shown in FIG. 27.
Figure 30:
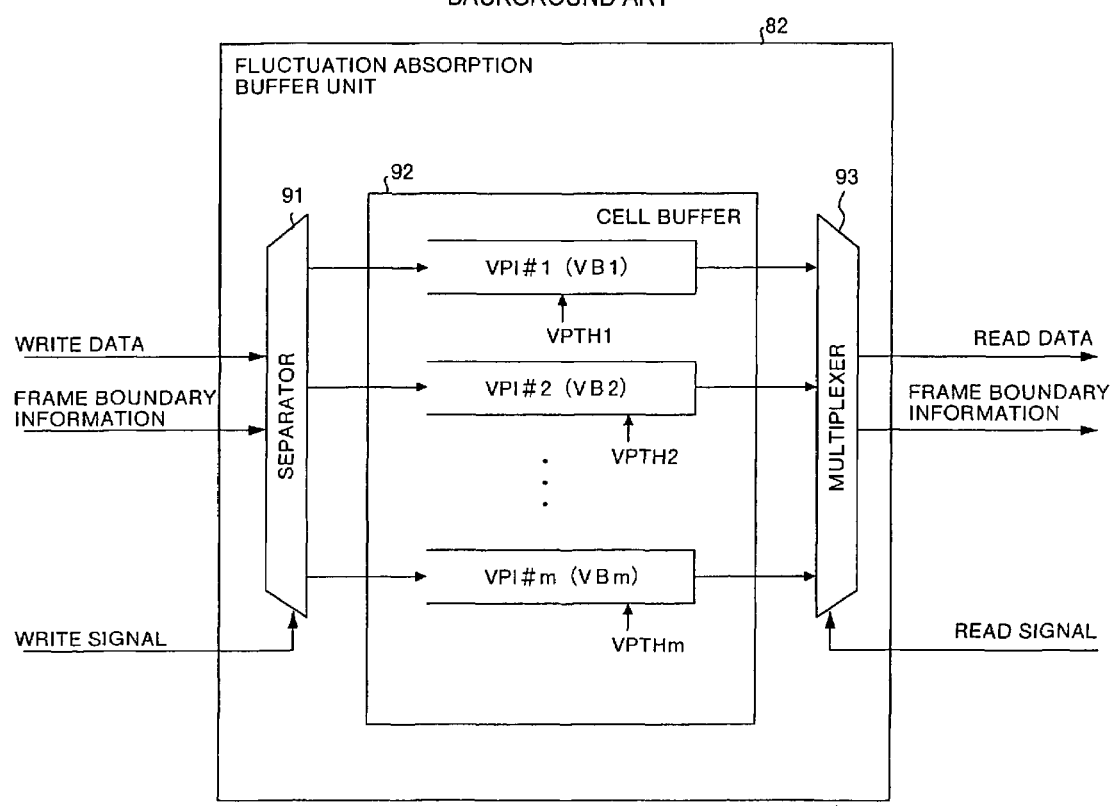
FIG. 30 is a functional block diagram showing a configuration of fluctuation absorption buffer shown in FIG. 29.

The fluctuation absorption buffer unit 11 is provided as a sub-block in the cell disassembly unit 2 same as in the prior art. The configuration and cell format of the cell assembly and disassembly device 1 are same as the configuration and cell format of the conventional cell assembly and disassembly device 61 shown in FIG. 27 and FIG. 28, except that the internal structure of the absorption fluctuation buffer unit 11 is mainly different.

Figure 4:
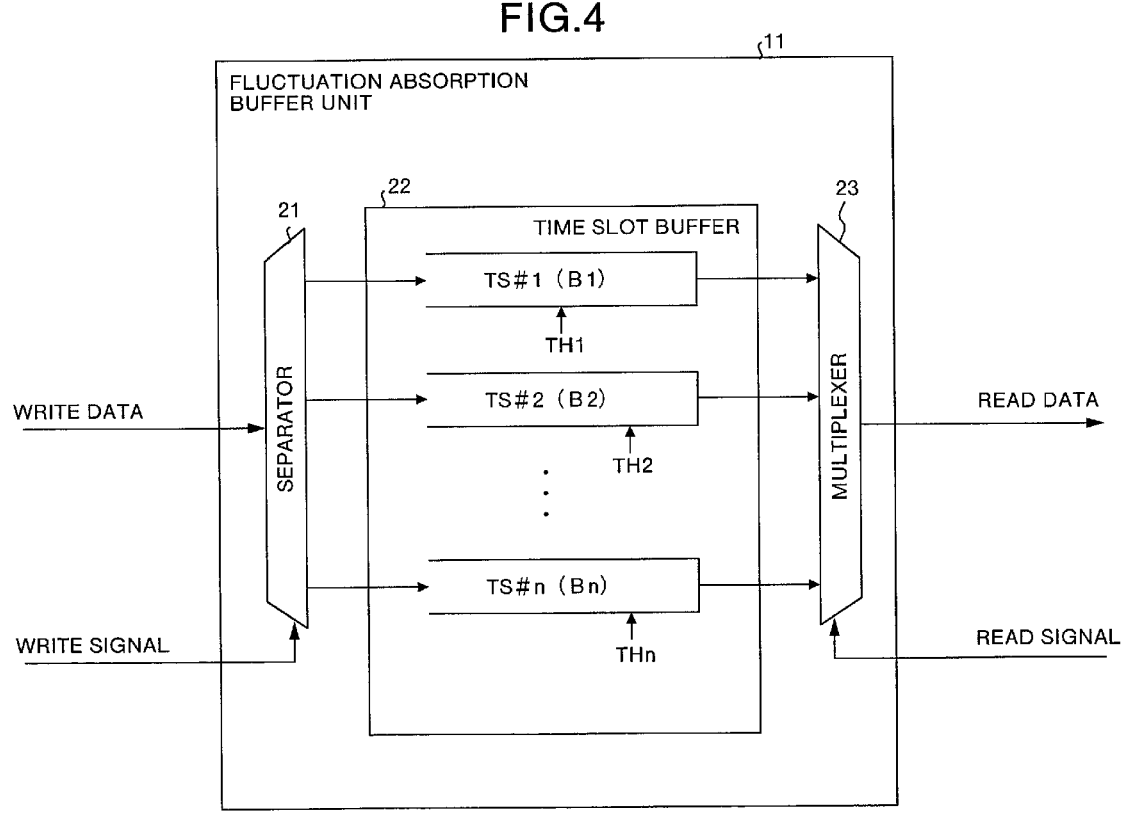
FIG. 4 is a functional block diagram showing a configuration of fluctuation absorption buffer unit in the first embodiment shown in FIG. 3.

FIG. 4 is a functional block diagram showing a configuration of the fluctuation absorption buffer unit 11 in the first embodiment shown in FIG. 3. The fluctuation absorption buffer unit 11 has individual buffers B1 (TS#1) to Bn (TS#n) (buffers of the invention) provided in each time slot, and comprises a time slot buffer 22 for storing write data temporarily in each time slot individually, a separator 21 for distributing write data from the AAL1 processor 12 into individual buffers B1 to Bn in the time slot buffer 22 according to an instruction (write signal) from the write controller 13, and a multiplexer 23 for multiplexing the data being read out from the individual buffers B1 to Bn in the time slot buffer 22 according to an instruction (read signal) from the read controller 15. In FIG. 4, TH1 to THn are reading-start thresholds set in the individual buffers B1 to Bn. For the sake of explanation, TH1 to THn are shown in FIG. 4, but actually these values are held in the reading-start threshold setting unit 16.

In the cell assembly and disassembly device 1, an ATM circuit interface unit 71 converts the bit row received from the ATM circuit interface 64 from serial to parallel, and processes the physical layer by detecting cell synchronism or the like, and transmits all extracted effective cells to the cell disassembly unit 2 together with the timing information. The AAL1 processor 12 in the cell disassembly unit 2 extracts the VPI from the header of the received cell, notices to the write controller 13, and analyzes the sequence number in the AAL1 header, and detects cell discarding and insertion of wrong cell.

When cell discarding is detected, in this case, the lost data is compensated (inserting all-1 pattern of 46 bytes if the discarded cell is supposed to be P format, or 47 bytes in the case of non-P format), and further when the discarded cell is supposed to be P format, the frame boundary information is also predicted and compensated. When a wrong cell insertion is detected, the wrong inserted cell is discarded. Later, the information extracted from the payload of the received cell is transmitted to the fluctuation absorption buffer unit 11, and the frame boundary information is transmitted to the write controller 13.

The write controller 13 analyzes the VPI received from the AAL1 processor 12, judges the sender (virtual path 65), determines the on/off timing of the write signal provided in each time slot from the result of this judgment, the VP (virtual path 65)/TS (time slot) conversion information received from the VP/TS conversion table 17 and the frame boundary information received from the AAL1 processor 12, generates a write signal according to the result of decision, and transmits to the fluctuation absorption buffer unit 11 and buffer monitor unit 14. The fluctuation absorption buffer unit 11 stores, according to the write signal received from the write controller 13, the data received from the AAL1 processor 12 temporarily in the individual buffers B1 to Bn prepared in each time slot (TS#1 to TS#n) by dividing and distributing in time slot units.

The buffer monitor unit 14 monitors the data accumulated amount held in the time slot buffer 22 in every individual buffers B1 to Bn, from the write signal from the write controller 13 and read signal from the read controller 15, and controls the operation of the write controller 13 and read controller 15 according to the result of monitoring. For example, the data accumulating amount in the individual buffers B1 to Bn which are empty upon start of communication gradually increases by turning on the write action instruction and turning off the read action instruction until reaching the reading-start thresholds TH1 to THn by write action, and when the data accumulated amount reaches the reading-start thresholds, the read action instruction is also turned on sequentially.

If an underflow or an overflow is detected in the individual buffers B1 to Bn, it is noticed to the reading-start threshold setting unit 16. An underflow is a state of individual buffers B1 to Bn becoming empty, not allowing to read out any longer, and an overflow is a state of the accumulated amount exceeding a specified threshold. This specific threshold is, for example, 2 times as much as the reading-start threshold, and the reading-start thresholds TH1 to THn should not be more than half of the capacity of the individual buffers B1 to Bn.

The read controller 15, when the reading-start instruction from the buffer monitor unit 14 is ON, generates read signals to be distributed correctly into the time slots in which read data is distributed, according to the instructions from the VP/TS conversion table 17 (showing which time slot is effective or which individual buffer is being used) and the timing information from the STM circuit interface unit 72, and transmits to the fluctuation absorption buffer unit 11. The reading-start threshold setting unit 16 stores the reading-start thresholds TH1 to THn for individual buffers B1 to Bn in the time slot buffer 22, and notices them to the buffer monitor unit 14. When receiving notice of occurrence of overflow or underflow from the buffer monitor unit 14, the reading-start threshold is changed.

The VP/TS conversion table 17 stores the corresponding relation of the virtual path 65 (VPI) and time slot, that is, the information showing which virtual path 65 is set (which VPI is present), and which time slot is used by each virtual path 65, and notices the information (VP/TS conversion information) to the write controller 13 and read controller 15. The STM circuit interface unit 72 inserts the data being read out by the read controller 15 into the payload (time slot) of the physical layer frame, converts from parallel into serial, and transmits to the STM circuit interface 62.

The reading-start thresholds TH1 to THn are independently held in the reading-start threshold setting unit 16. The reading-start timing from the individual buffers B1 to Bn in the time slot buffer 22 is determined independently in the individual buffers B1 to Bn by the buffer monitor unit 14. Setting or change of reading-start thresholds TH1 to THn held in the reading-start threshold setting unit 16 may be operated by the user or manager by means of DIP switch not shown in the diagram, or from a device managing unit 75 through control bus not shown, or by using an original setting panel.

Figure 5:
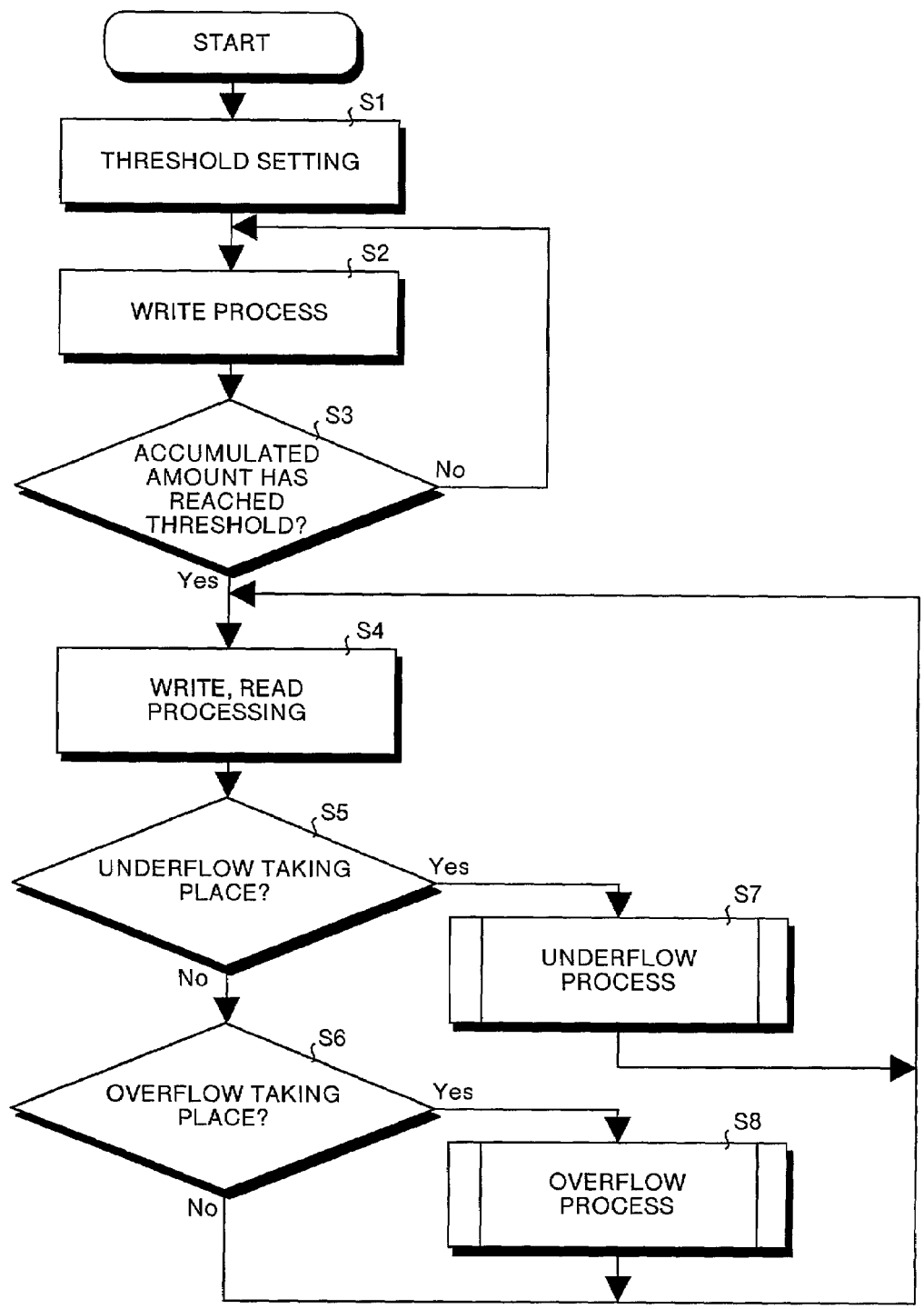
FIG. 5 is a flowchart showing flow of fluctuation absorption process in the first embodiment.

In this constitution, the operation of the first embodiment is explained below by referring to the flowchart in FIG. 5 to FIG. 8. The same parts as in the prior art mentioned above are not explained, and only the characteristic parts of the invention different from the prior art, that is, steps of absorbing fluctuations (fluctuation absorption process) conducted in the cell disassembly unit 2 are explained below. FIG. 5 is a flowchart showing flow of fluctuation absorption process in the first embodiment. In the fluctuation absorption process in the first embodiment, first of all, reading-start thresholds TH1 to THn are set in the reading-start threshold setting unit 16 (step S1).

When communication is started, the buffer monitor unit 14 controls the write controller 13, and starts to write the data distributed in each time slot into the corresponding individual buffers B1 to Bn in the time slot buffer 22, and repeats writing only until the data accumulated amount in the individual buffers B1 to Bn reaches the corresponding reading-start thresholds TH1 to THn (steps S2, S3). When the amount of data accumulated in any one of the individual buffers reaches the reading-start threshold corresponding to the individual buffer, the read controller 15 is controlled, and in this individual buffer, reading is started parallel to writing (step S4). This writing and reading process is executed in a simple first-in first-out (FIFO) principle.

In succession, checking for occurrence of underflow or overflow (steps S5, S6), steps S4 to S6 are repeated until underflow or overflow takes place. Herein, the read controller 15 reads out at a specific interval in each time slot, and fluctuations are absorbed. In the event of an underflow, the underflow process mentioned below is executed (step S7), and the process returns to step S4. In the event of an overflow, the overflow process mentioned below is executed (step S8), and the process returns to step S4.

In FIG. 5, for the sake of explanation, step S1 is placed at the beginning of the flowchart, but setting of reading-start thresholds TH1 to THn at step S1 is not required again if once set in the past communication. In the midst of communication, the reading-start thresholds TH1 to THn may be changed (set again). As a result, the reading-start thresholds TH1 to THn can be changed depending on the environments.

It is a major feature of the first embodiment that fluctuations are absorbed in each time slot, not in each virtual path 65. Whatever may be the maximum communication speed of the STM circuit interface 62 (for example, whether ISDN primary group speed or secondary group speed), the communication speed in each time slot is always 64 kb/s, and the reading-start thresholds TH1 to THn of individual buffers B1 to Bn in each time slot and necessary capacity L are basically expressed as follows, same as in the foregoing equations 1 and 2, supposing the maximum of the delay fluctuation determined as the characteristic of the ATM network 63 to be ±D (identifier k=1 to n).

$$THk = [64 \text{ kb/s}] \times D \tag{6}$$

$$Lk = 2 \times THk = 2 \times [64 \text{ kb/s}] \times D \tag{7}$$

However, if only one time slot is assigned for one virtual path 65, since the received data is written into the time slot buffer 22 in cell unit, in order to cope with such a case, if the calculation result in equation 6 is 47 bytes (worth 1 cell) or less, it is necessary to express as follows same as in the foregoing equations 3 and 4.

$$THk = 48 \text{ bytes}(1 \text{ cell} + 1 \text{ byte}) \tag{8}$$

$$Lk = 94 \text{ bytes}(2 \text{ cells}) \tag{9}$$

As clear from equations 6 to 9, THk and Lk are always constant, not depending on the identifier k.

Besides, as shown below, the total memory capacity Lt of the time slot buffer 22 is basically same as the total memory capacity Ls of the cell buffer 92 in the common memory method of the prior art.

$$Lt = \sum Lk = 2 \times [64 \text{ kb/s}] \times n \times D \tag{10}$$
$$= 2 \times V\max \times D = Ls$$

Further, in the STM circuit interface 62, by controlling so that the data to be issued in the same frame may be written in the mutually same configuration (to be read in the same frame) in the individual buffers B1 to Bn, the internal composition of the time slot buffer 22 itself is the frame boundary information, and it is not necessary to store the frame boundary information separately in the memory as in the conventional method. As a result, the total memory capacity may be further decreased from that of the conventional common memory method. In this case, to read out from the time slot buffer 22, it is as simple as to read out sequentially from the individual buffer B1 to Bn in the same frame, and the control circuit in the read controller 15 is also simplified.

As known from the explanation so far, since the capacity L of the individual buffers B1 to Bn does not depend on the communication speed of the virtual path 65, same as in the conventional individual memory system, the individual buffers B1 to Bn can be composed of simple first-in first-out (FIFO) memories, and the capacity L is always sufficient at minimum capacity (capacity enough to accommodate communication speed of 64 kb/s), and therefore the memory control circuit in the fluctuation absorption buffer 11 is simpler than in the conventional individual memory system. In addition to delay fluctuations, it may be also designed to determine the memory quantity of the time slot buffer 22 in consideration of multiplexing fluctuations occurring in cell transfer and others.

Figure 6:
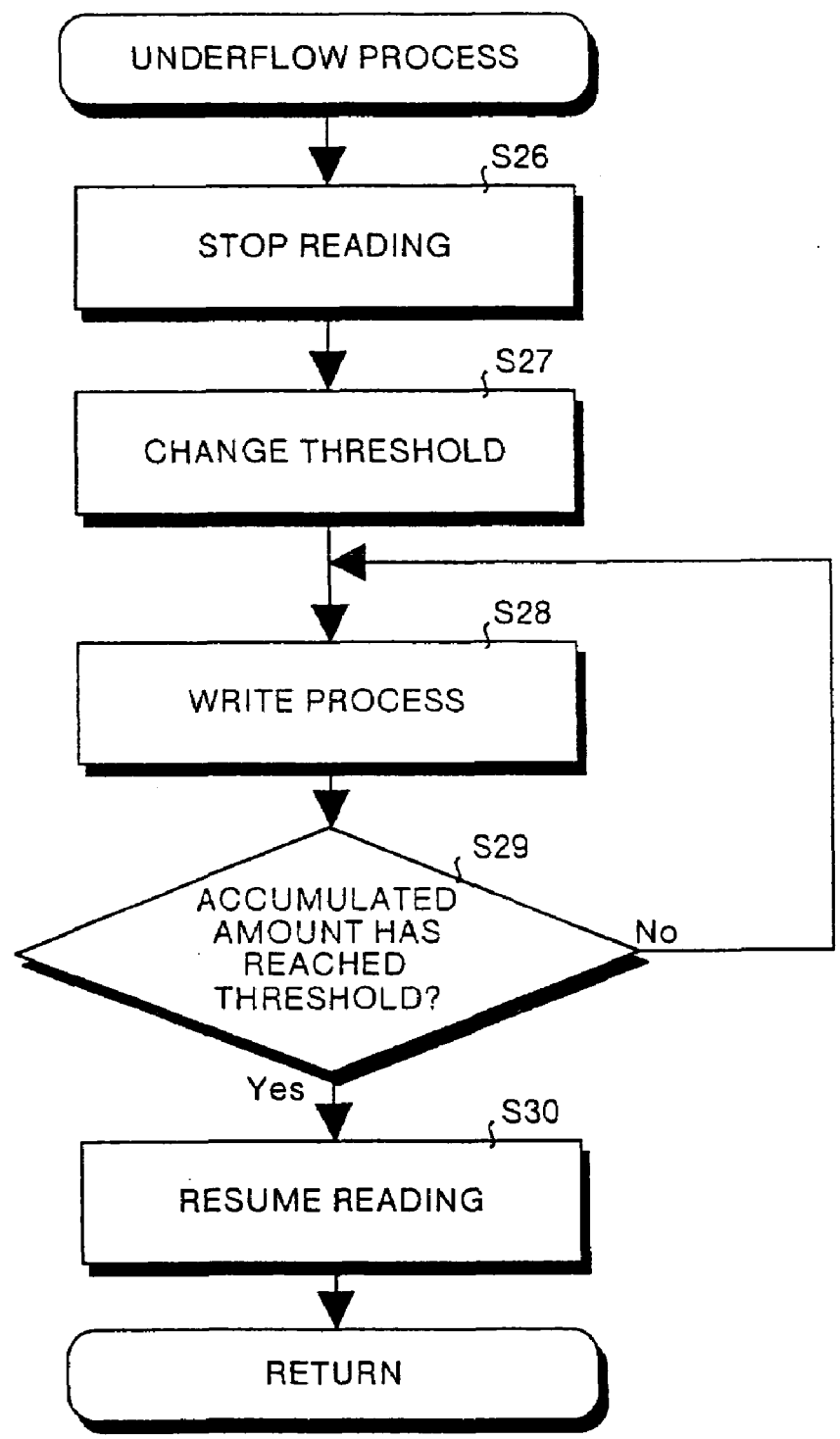
FIG. 6 is a flowchart showing flow of underflow process in the first embodiment.

The underflow processing at step S7 is explained below. FIG. 6 is a flowchart showing flow of underflow process in the first embodiment. In the underflow processing in the first embodiment, the buffer monitor unit 14 detecting occurrence of an underflow in any one of the individual buffers B1 to Bn once turns off the read action instruction to the read controller 15, and temporarily stops reading out from the individual buffer having the underflow (step S26). Consequently, the reading-start threshold corresponding to the individual buffer having the underflow is increased by a specified amount (step S27). In succession, until the data accumulated amount in this individual buffer reaches again the reading-start threshold corresponding to this individual buffer, only writing is repeated in this individual buffer (steps S28, S29). When the data accumulated amount in this individual buffer reaches again the reading-start threshold corresponding to this individual buffer, reading from this individual buffer is resumed (step S30).

Thus, in the underflow processing in the first embodiment, reading from the individual buffer having the underflow is once stopped, and when the data accumulated amount later reaches the reading-start threshold corresponding to this individual buffer again, reading is resumed. That is, when an underflow occurs, the operation is same as the operation right after start of communication. Besides, the reading-start threshold corresponding to the individual buffer having the underflow is automatically increased by a specified amount. That is, upon every occurrence of underflow, the fixed delay added to the data is automatically increased by a specific amount each.

Therefore, if an underflow occurs, a normal communication state is recovered promptly, and the fixed delay added to the data for fluctuation absorption can be automatically increased as required. The reading-start thresholds TH1 to THn should not exceed the half value of the capacity of the individual buffers B1 to Bn. Fluctuations are composed of those in the delaying direction and others in advancing direction, which are considered to occur at same probability, and therefore if the reading-start thresholds TH1 to THn exceed the half value of the capacity of the individual buffers B1 to Bn, the data may overflow from the individual buffers B1 to Bn.

Figure 7:
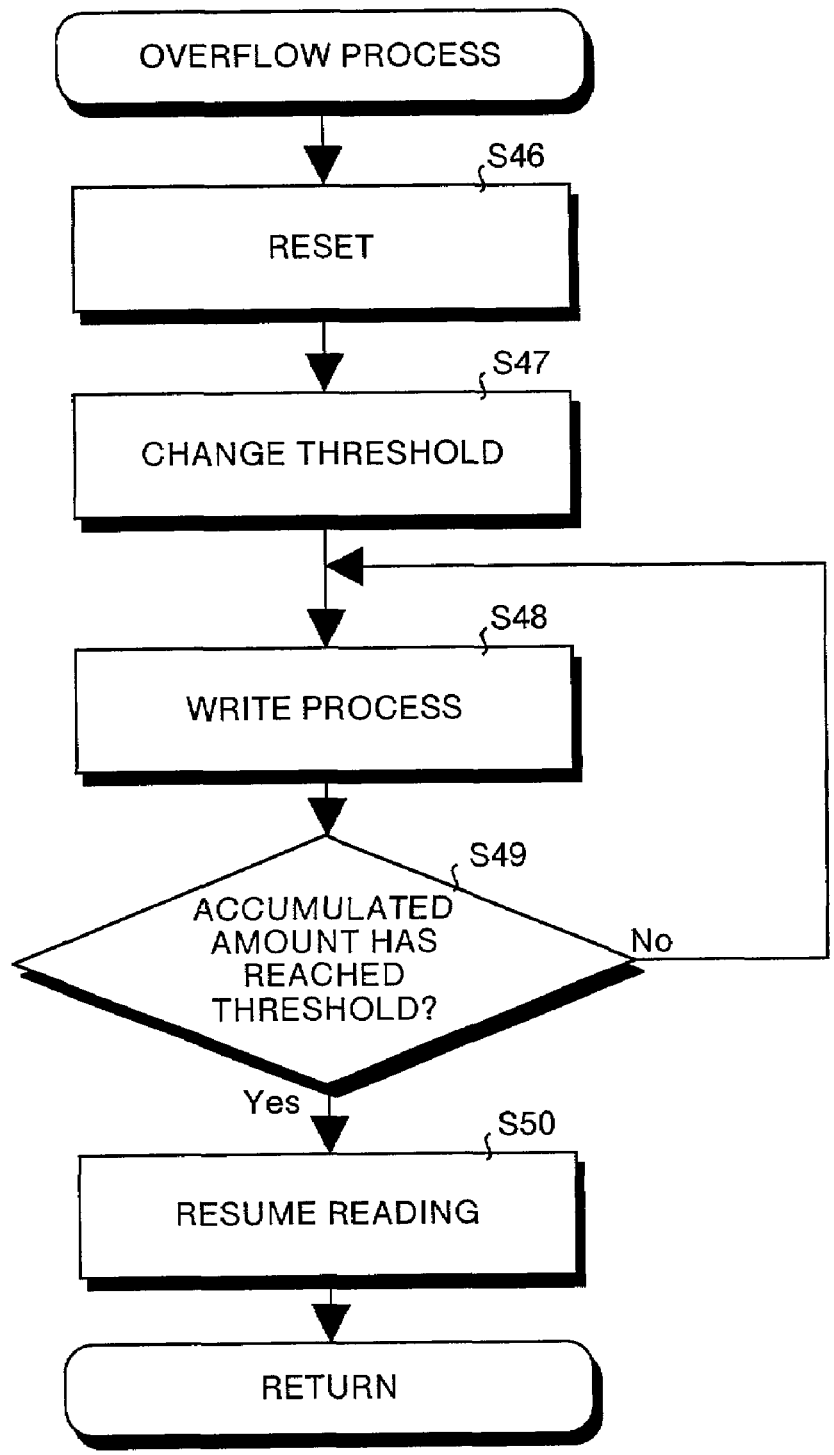
FIG. 7 is a flowchart showing flow of overflow process in the first embodiment.

The overflow processing at step S8 is explained. FIG. 7 is a flowchart showing flow of overflow process in the first embodiment. In the overflow processing in the first embodiment, the buffer monitor unit 14 detecting occurrence of an overflow in any one of the individual buffers B1 to Bn first transmits a reset instruction to the individual buffer having the overflow to the fluctuation absorption buffer 11, and resets this individual buffer. Once turning off the read action instruction to the read controller 15, reading out from the individual buffer having the overflow is stopped temporarily (step S46).

Consequently, the reading-start threshold corresponding to the individual buffer having the overflow is increased by a specified amount (step S47). In succession, until the data accumulated amount in this individual buffer reaches again the reading-start threshold corresponding to this individual buffer, only writing is repeated in this individual buffer (steps S48, S49). When the data accumulated amount in this individual buffer reaches again the reading-start threshold corresponding to this individual buffer, reading from this individual buffer is resumed (step S50).

Thus, in the overflow processing in the first embodiment, the individual buffer having the overflow is reset, and reading from this individual buffer is once stopped, and when the data accumulated amount later reaches the reading-start threshold corresponding to this individual buffer again, reading is resumed. That is, when an overflow occurs, the operation is same as the operation right after start of communication. Besides, the reading-start threshold corresponding to the individual buffer having the overflow is automatically increased by a specified amount. That is, upon every occurrence of overflow, the fixed delay added to the data is automatically increased by a specific amount each.

Figure 8:
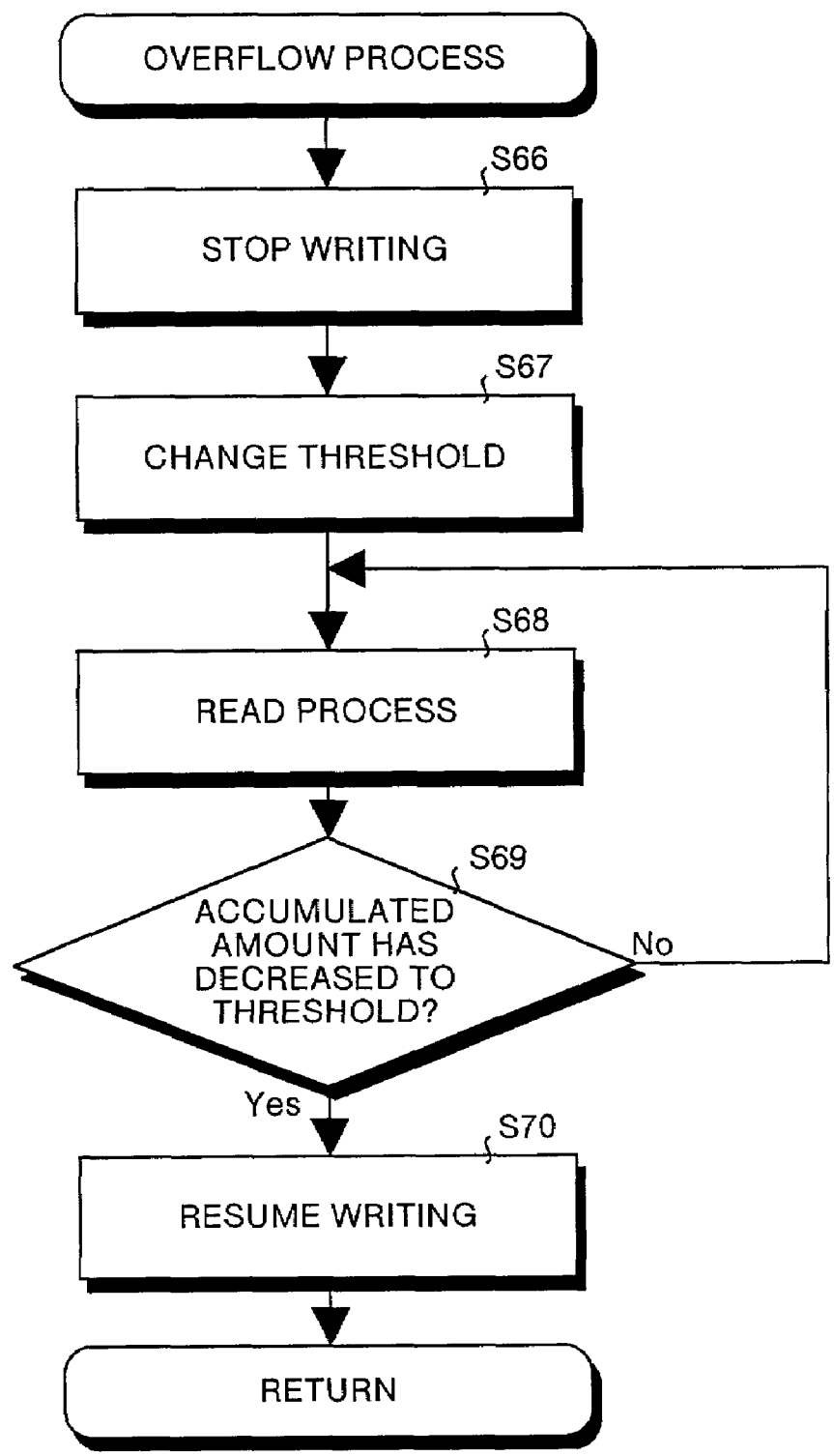
FIG. 8 is a flowchart showing other flow of overflow process in the first embodiment.

FIG. 8 is a flowchart showing other flow of overflow process in the first embodiment. In the overflow processing, the buffer monitor unit 14 detecting occurrence of an overflow in any one of the individual buffers B1 to Bn once turns off the write action instruction to the write controller 13, and temporarily stops writing into the individual buffer having the overflow (step S66). Consequently, the reading-start threshold corresponding to the individual buffer having the overflow is increased by a specified amount (step S67). In succession, until the data accumulated amount in this individual buffer decreases again to the reading-start threshold corresponding to this individual buffer, only reading is repeated in this individual buffer (steps S68, S69). When the data accumulated amount in this individual buffer decreases again to the reading-start threshold corresponding to this individual buffer, writing is resumed (step S70).

Thus, in this overflow processing, writing into the individual buffer having the overflow is once stopped, and when the data accumulated amount decreases to the reading-start threshold corresponding to this individual buffer again, writing is resumed. That is, when an overflow occurs, the write operation and read operation are opposite to the operation at the time of underflow (writing and reading being exchanged mutually). Besides, the reading-start threshold corresponding to the individual buffer having the overflow is automatically increased by a specified amount. That is, upon every occurrence of overflow, the fixed delay added to the data is automatically increased by a specific amount each.

By these overflow processes, if an overflow occurs, a normal communication state is recovered promptly, and the fixed delay added to the data for fluctuation absorption can be automatically increased as required. Further, if the threshold for overflow detection is set at 2 times the reading-start thresholds TH1 to THn, along with elevation of the reading-start thresholds TH1 to THn, the threshold for overflow detection climbs up, and the probability of occurrence of overflow decreases.

Same as in the occurrence of underflow, the reading-start thresholds TH1 to THn should not exceed the half value of the capacity of the individual buffers B1 to Bn. Fluctuations are composed of those in the delaying direction and others in advancing direction, which are considered to occur at same probability, and therefore if the reading-start thresholds TH1 to THn exceed the half value of the capacity of the individual buffers B1 to Bn, the data may overflow from the individual buffers B1 to Bn.

As described herein, according to the first embodiment, since fluctuations are absorbed in each time slot, instead of each virtual path 65, after distributing data into time slots, increase of total memory capacity and complication of memory control circuit can be suppressed. In other words, both decrease of total memory capacity and simplification of memory control circuit can be realized at the same time. In the event of an underflow, reading from the individual buffer having the underflow is once stopped, and when the data accumulated amount later reaches again the reading-start threshold corresponding to this individual buffer, reading is resumed, so that a normal communication state is recovered promptly in a simple procedure in the event of an underflow.

Similarly, in the event of an overflow, the individual buffer having the overflow is reset, and reading from this individual buffer is once stopped, and when the data accumulated amount later reaches again the reading-start threshold corresponding to this individual buffer, reading is resumed, or writing into the individual buffer having the overflow is once stopped, and when the data accumulated amount later decreases again to the reading-start threshold corresponding to this individual buffer, writing is resumed, and therefore a normal communication state is recovered promptly in a simple procedure in the event of an overflow.

Moreover, on every occurrence of underflow or overflow, the fixed delay added to the data is automatically increased by a specific amount each, and the fixed delay added to the data for fluctuation absorption can be increased automatically as required. Further, the reading-start threshold used initially upon start of communication and the reading-start threshold used after occurrence of underflow or overflow may be different from each other, but when they are set as the same reading-start thresholds TH1 to THn, the change of reading-start threshold upon occurrence of underflow or overflow may be also reflected upon start of communication.

In the first embodiment, the reading-start timing from the time slot buffer 22 is "when the buffer monitor unit 14 detects for the first time that the data accumulated amount in the individual buffers B1 to Bn reaches the reading-start thresholds TH1 to THn," but in the second embodiment, by contrast, it is the time "when the buffer monitor unit 14 detects the lapse of time after start of communication reaches the reading-start wait time W1 to Wn." That is, in the first embodiment, the data accumulated mount is the trigger of reading start, whereas in the second embodiment, the lapse of time after start of communication is the trigger of reading start.

Figure 9:
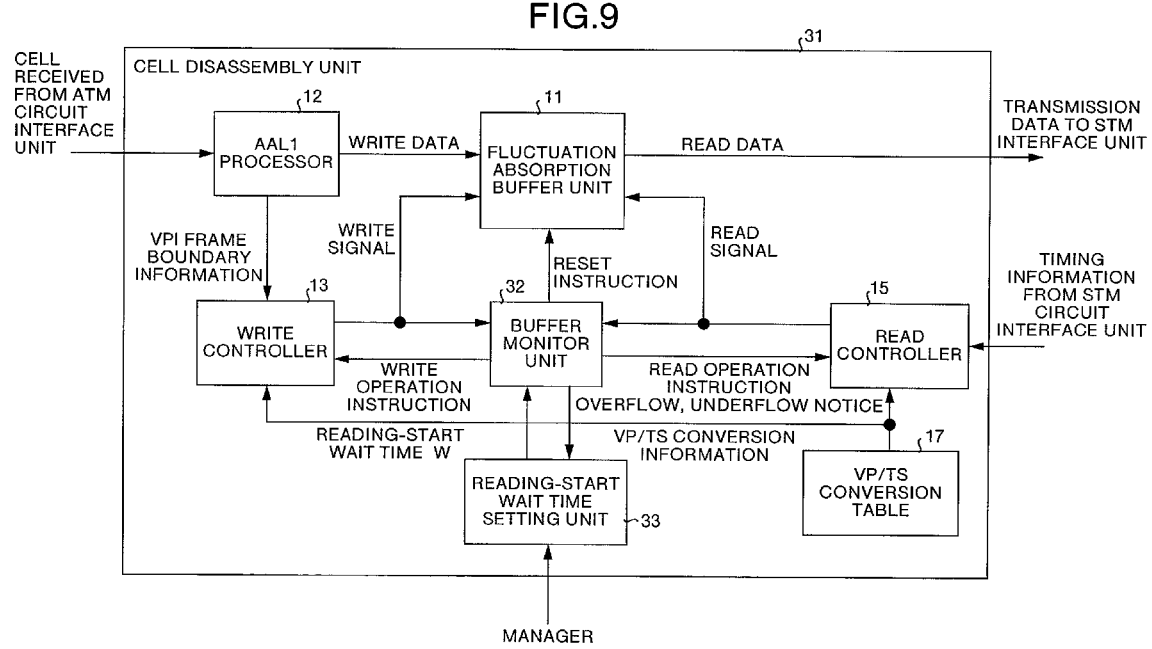
FIG. 9 is a functional block diagram showing a configuration of cell disassembly unit in a second embodiment of the invention.

The second embodiment is basically same as the first embodiment in configuration, and explanation is omitted in same parts, and only different parts are explained below. FIG. 9 is a functional block diagram showing a configuration of cell disassembly unit in the second embodiment of the invention. Same parts as in FIG. 3 are identified with same reference numerals. The cell disassembly unit 31 in the second embodiment comprises a buffer monitor unit 32 and a reading-start wait time setting unit 33, instead of the buffer monitor unit 2 and reading-start threshold setting unit 16 in the cell disassembly unit 2 in the first embodiment.

The reading-start wait time setting unit 33 is similar to the reading-start threshold setting unit 16 in the first embodiment in configuration and operation, but differs that it stores reading-start wait times W1 to Wn for individual buffers B1 to Bn in the time slot buffer 22, instead of red start thresholds TH1 to THn, and that it notices them to the buffer monitor unit 32. Setting or change of reading-start wait times W1 to Wn in the reading-start wait time setting unit 33 may be operated by the user or manager by means of DIP switch not shown in the diagram, or from a device managing unit 75 through control bus not shown, or by using an original setting panel.

The buffer monitor unit 32 is same as the buffer monitor unit 14 in the first embodiment in configuration, but is slightly different in operation. The buffer monitor unit 32 monitors the write signal from the write controller 13 in every individual buffers B1 to Bn, and controls the reading-start timing according to the result. For example, by monitoring the write signal, the communication start timing of each one of individual buffers B1 to Bn is detected, and when communication is started, internal timers T1 to Tn, not shown, provided in individual buffers B1 to Bn are operated, and the lapse of time after start of communication is measured.

The result of measurement of lapse of time and reading-start wait times W1 to W2 from the reading-start wait time setting unit 33 are compared, and the write operation instruction is turned on and the read operation instruction is turned off until the lapse of time reaches the reading-start wait times W1 to Wn, and the read operation instruction is also turned on to start reading sequentially from the one reaching the lapse of time of W1 to Wn. If an underflow or overflow is detected in the individual buffers B1 to Bn, it is noticed to the reading-start wait time setting unit 33. Receiving this notice, the reading-start wait time setting unit 33 changes the reading-start wait time.

Figure 10:
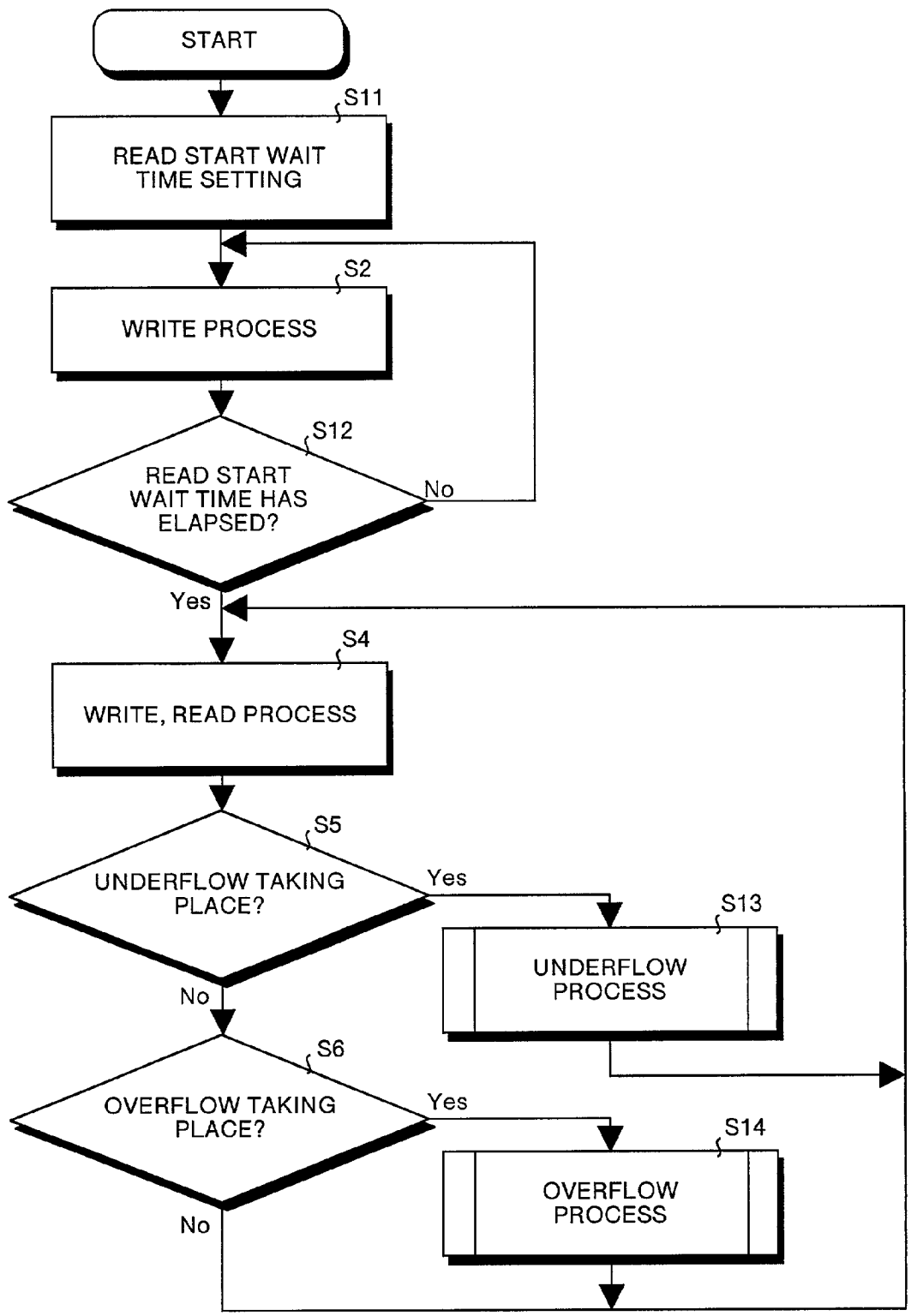
FIG. 10 is a flowchart showing flow of fluctuation absorption process in the second embodiment.

In the second embodiment having such configuration, the operation is explained below by referring to the flowcharts in FIG. 10 to FIG. 13. In the second embodiment, the operation is same as in the first embodiment, and explanation is omitted as for same parts, and only different parts are explained. FIG. 10 is a flowchart showing flow of fluctuation absorption process in the second embodiment. Same pars as in FIG. 5 are identified with same reference numerals. In the fluctuation absorption process in the second embodiment, instead of setting of reading-start thresholds TH1 to THn at step S1, the reading-start wait times W1 to Wn is set (step S11). Further, instead of judging whether the data accumulated amount in the individual buffers B1 to Bn has reached the reading-start thresholds TH1 to THn or not at step S3, it is judged whether passing the reading-start wait times W1 to Wn or not at step S12.

That is, once communication is started, the buffer monitor unit 32 controls the write controller 13, starts the process of writing data distributed into time slots into individual corresponding buffers B1 to Bn in the time slot buffer 22, and repeats writing only until the lapse of time from start of communication of the individual buffers W1 to Wn reaches the corresponding reading-start wait times W1 to Wn (steps S2, S12). When the lapse of time from start of communication of any one of the individual buffers reaches the reading-start wait time corresponding to the individual buffer, the read controller 15 is controlled, and writing and reading are started simultaneously in this individual buffer (step S4) Instead of the underflow processing at step S7 and overflow processing at step S8, the underflow processing at step S13 and overflow processing at step S14 mentioned below are executed. In FIG. 10, for the sake of explanation, step S11 is placed at the beginning of the flowchart, but setting of reading-start wait times W1 to Wn at step S11 is not required again if once set in the past communication. In the midst of communication, the reading-start wait times W1 to Wn may be changed (set again). As a result, the reading-start wait times W1 to Wn can be changed depending on the environments.

Figure 11:
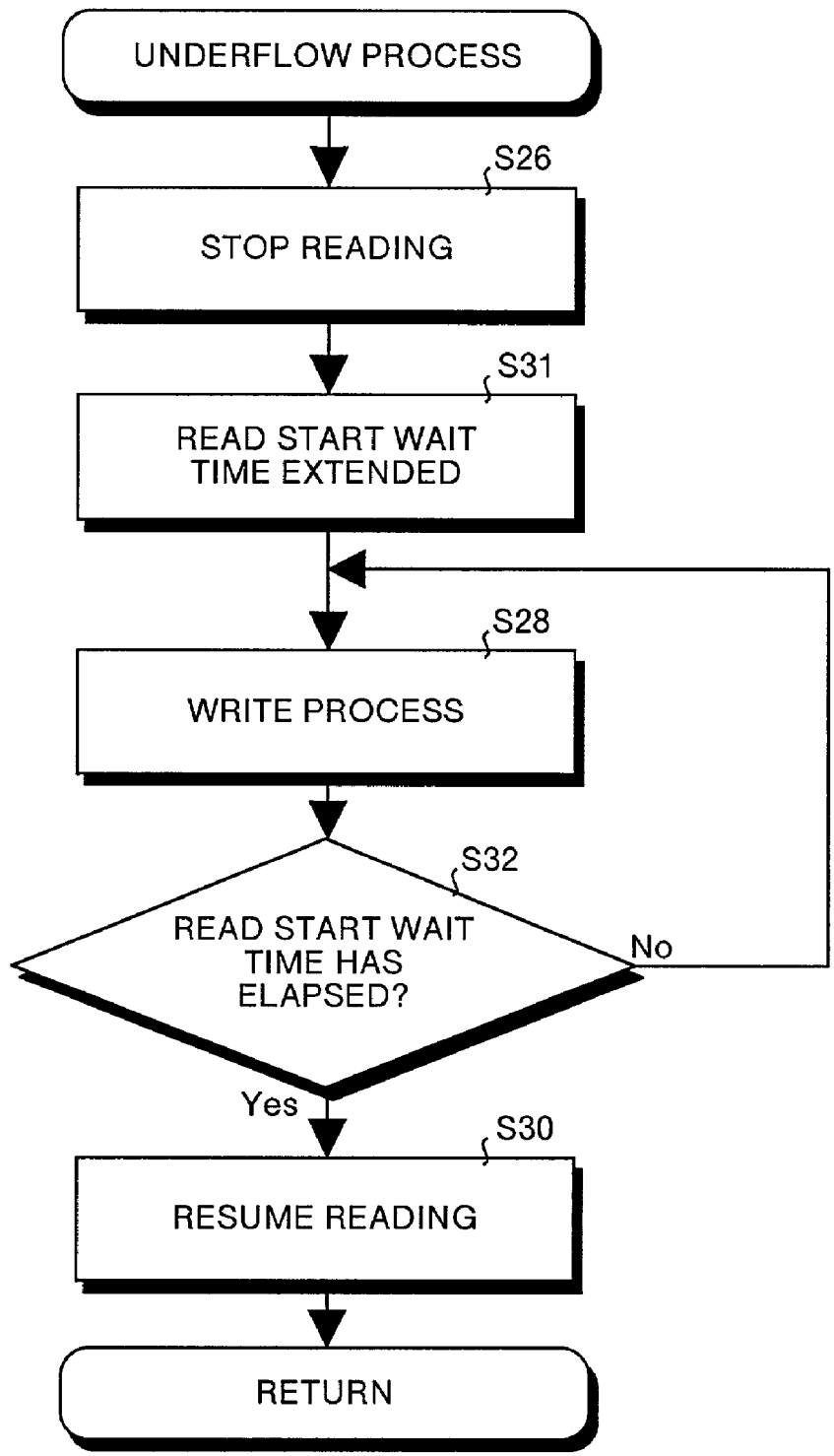
FIG. 11 is a flowchart showing flow of underflow process in the second embodiment.

The underflow processing at step S13 is explained below. FIG. 11 is a flowchart showing flow of underflow process in the second embodiment. Same parts as in FIG. 6 are identified with same reference numerals. In the underflow processing in the second embodiment, instead of increasing the reading-start threshold by a specified amount at step S27, the reading-start wait time is extended by a specified time at step S31. Further, instead of judging if the data accumulated amount in the individual buffer having the underflow has reached the reading-start threshold again at step S29, it is judged at step S32, after occurrence of underflow, if passing over the reading-start wait time corresponding to the individual buffer having the underflow.

That is, the buffer monitor unit 32 detecting occurrence of underflow at individual buffers B1 to Bn once turns off the read operation instruction corresponding to the read controller 15, and once stops reading from the individual buffer having the underflow (step S26), and extends the reading-start wait time for the individual buffer having the underflow by a specified time (step S31). Until the time of lapse after occurrence of underflow reaches the reading-start wait time corresponding to this individual buffer, only writing is done in this individual buffer (steps S28, S32), and then reading is resumed (step S30).

Figure 12:
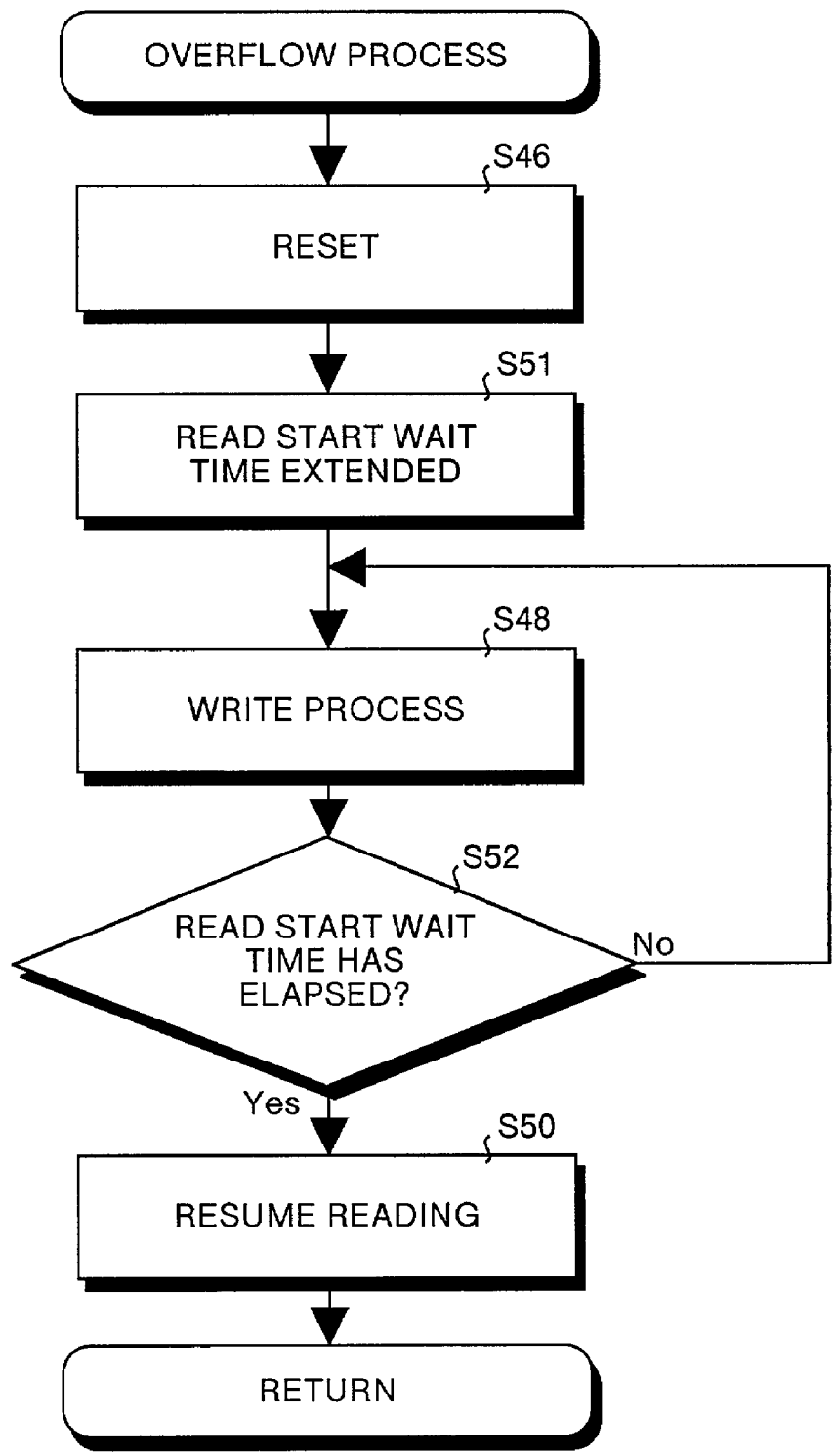
FIG. 12 is a flowchart showing flow of overflow process in the second embodiment.

The overflow processing at step S14 is explained below. FIG. 12 is a flowchart showing flow of overflow process in the second embodiment. Same parts as in FIG. 7 are identified with same reference numerals. In the overflow processing in the second embodiment, instead of increasing the reading-start threshold by a specified amount at step S47, the reading-start wait time is extended by a specified time at step S51. Further, instead of judging if the data accumulated amount in the individual buffer having the underflow has reached the reading-start threshold again at step S49, it is judged at step S52, after resetting at step S46, if passing over the reading-start wait time corresponding to the individual buffer having the overflow.

That is, the buffer monitor unit 32 detecting occurrence of overflow at individual buffers B1 to Bn transmits a resetting instruction for the individual buffer having the overflow to the fluctuation absorption buffer 1 to reset this individual buffer, and once turns off the read operation instruction to the read controller 15, and stop temporarily reading from the individual buffer having the overflow (step S46). The reading-start wait time corresponding to the individual buffer having the overflow is extended by a specified time (step S51), and until the time of lapse after execution of resetting reaches the reading-start wait time corresponding to this individual buffer, only writing is repeated in this individual buffer (steps S48, S52), and then reading is resumed (step S50).

Figure 13:
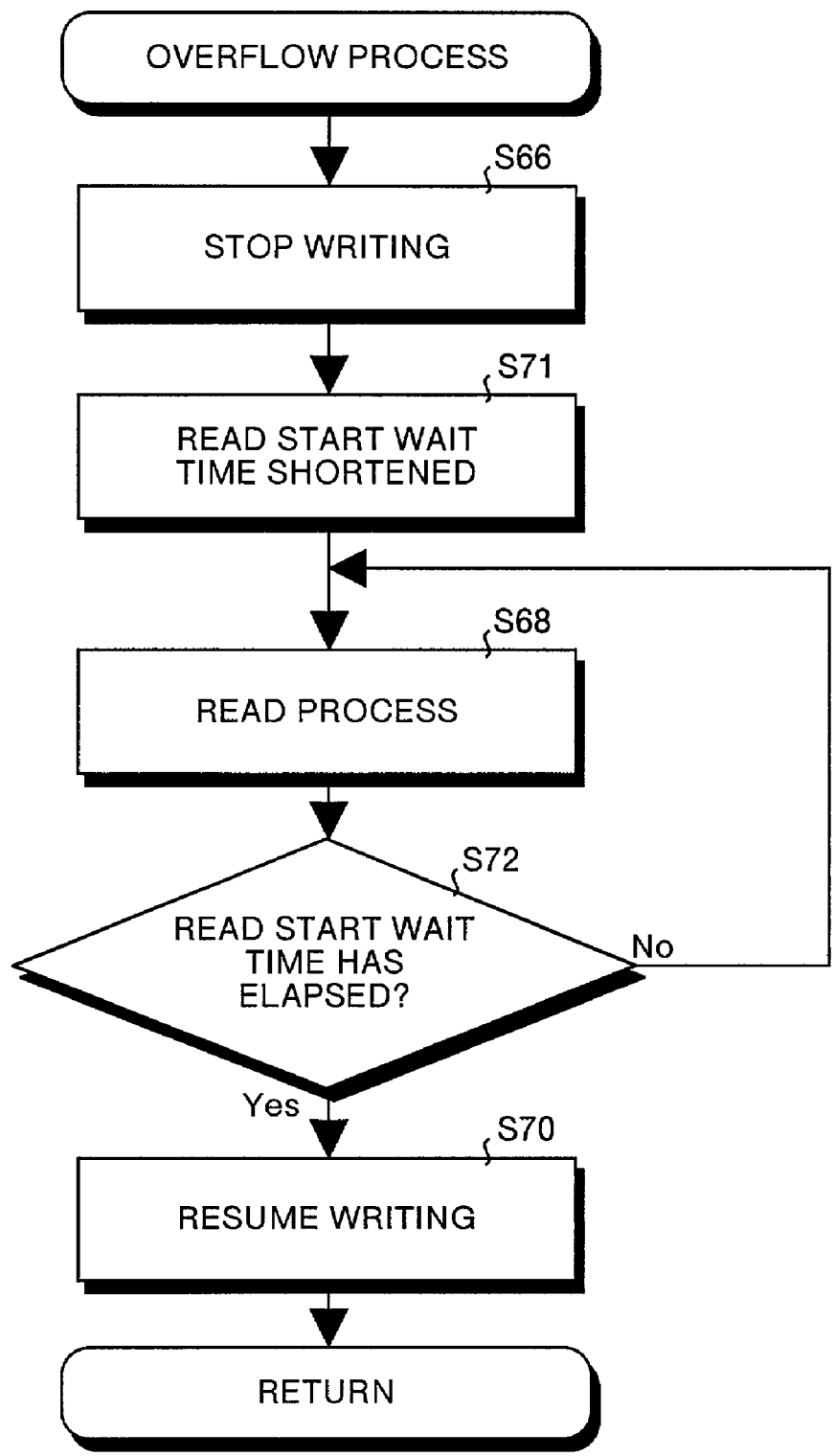
FIG. 13 is a flowchart showing other flow of overflow process in the second embodiment.

FIG. 13 is a flowchart showing other flow of overflow process in the second embodiment. Same parts as in FIG. 8 are identified with same reference numerals. In this overflow processing, instead of increasing the reading-start threshold at step S67, the reading-start wait time is extended by a specified time at step S71 (in this case, when the reading-start wait time is shortened, the fixed delay added to the data is increased). Further, instead of judging if the data accumulated amount in the individual buffer having the underflow has decreased to the reading-start threshold at step S69, it is judged at step S72, after occurrence of overflow, if passing over the reading-start wait time corresponding to this individual buffer.

That is, the buffer monitor unit 32 detecting occurrence of overflow at individual buffers B1 to Bn once turns off the write operation instruction to the write controller 13, and stops writing into the individual buffer having the overflow (step S66), and shortens the reading-start wait time corresponding to the individual buffer having the overflow by a specified time (step S71). Until passing over the reading-start wait time corresponding to this individual buffer, only reading is repeated in this individual buffer (steps S68, S72), and then writing is resumed (step S70).

Thus, according to the second embodiment, upon start of communication or in the event of overflow or underflow, if reading or writing is controlled depending on the lapse of time, the same effects as in the first embodiment are obtained.

In the first embodiment, the reading-start thresholds TH1 to THn are held in the reading-start threshold setting unit 16 in each time slot, and the reading-start timing in the buffer monitor unit 14 is controlled in each time slot, but in the third embodiment, it is designed to control in every virtual path 65. That is, the reading-start timing is independently determined in the individual buffers B1 to Bn in the first embodiment, whereas in the third embodiment it is designed to determine the reading-start timing in batch by grouping the individual buffers B1 to Bn into those corresponding to one same virtual path 65.

Figure 14:
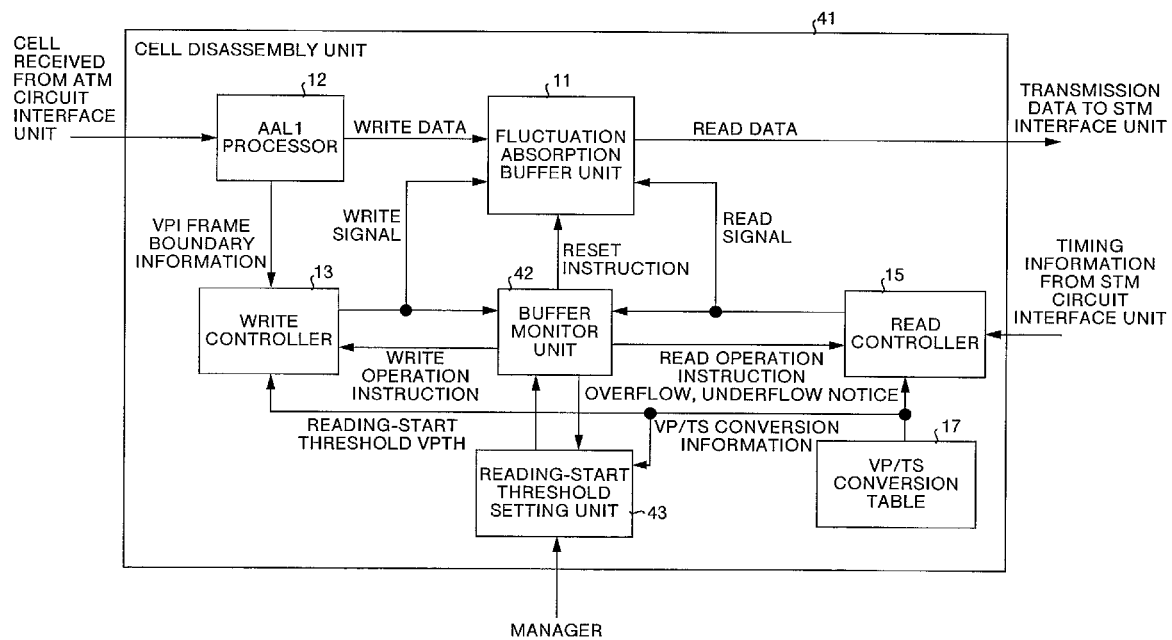
FIG. 14 is a functional block diagram showing a configuration of cell disassembly unit in a third embodiment of the invention.

The third embodiment is basically same as the first embodiment in configuration, and only different parts are explained. FIG. 14 is a functional block diagram showing a configuration of cell disassembly unit in the third embodiment of the invention. Same parts as in FIG. 3 are identified with same reference numerals. A cell disassembly unit 41 in the third embodiment comprises a buffer monitor unit 42 and a reading-start threshold setting unit 43, instead of the buffer monitor unit 14 and reading-start threshold setting unit 16 of the cell disassembly unit 2 in the first embodiment.

The reading-start threshold setting unit 43 is same as the reading-start threshold setting unit 16 in the first embodiment in configuration and operation, except that the reading-start thresholds VPTH1 to VPTHm in every virtual path 65 same as in the prior art are held, instead of the reading-start thresholds TH1 to THn in every time slot, by receiving VP/TS conversion information from the VP/TS conversion table 17, and they are noticed to the buffer monitor unit 42. Setting or change of reading-start thresholds VPTH1 to VPTHm in the reading-start threshold setting unit 43 may be operated by the user or manager by means of DIP switch not shown in the diagram, or from a device managing unit 75 through control bus not shown, or by using an original setting panel.

The buffer monitor unit 42 is composed same as in the first embodiment, and monitors the write signal from the write controller 13 in individual buffers B1 to Bn same as in the first embodiment, and determines the reading-start timing on the basis of the result, but those corresponding to a same virtual path 65 are grouped together to be controlled to start reading at the same time. By such control, it is assured more securely than in the first embodiment that the data to be issued in the same frame in the STM circuit interface 62 are actually issued in the same frame. If an underflow or overflow occurs in the individual buffers B1 to Bn, it is noticed to the reading-start threshold setting unit 43. Receiving this notice, the reading-start threshold setting unit 43 changes the reading-start threshold.

Figure 15:
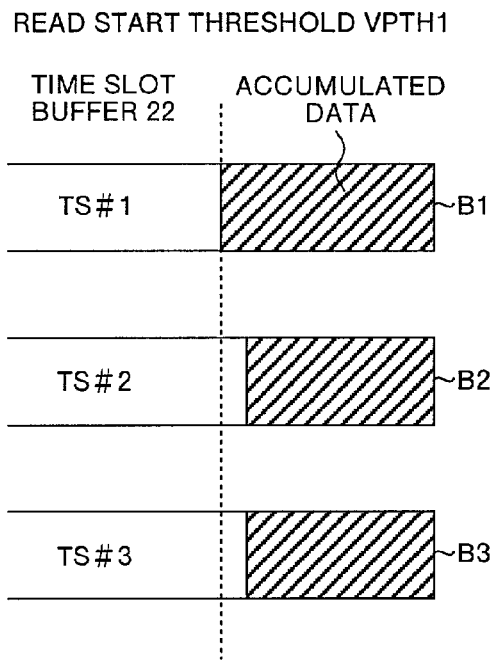
FIG. 15 is an explanatory diagram showing a method of determining reading-start timing in the third embodiment.

The method of determining the reading-start timing of the grouped individual buffers B1 to Bn is explained by referring to FIG. 15. FIG. 15 is an explanatory diagram in which three individual buffers B1 to B3 are grouped together. As shown in the diagram, the data accumulated amounts in the individual buffers B1 to B3 are not always the same. It is highly possible that more data is accumulated temporarily in the time slot of earlier (smaller) number. In the determining method of reading-start timing in the third embodiment, when the accumulated data amount in one of the individual buffers in the group reaches the reading-start threshold VPTH1 corresponding to the group, It is controlled to start reading from all individual buffers B1 to B3 in this group.

That is, the reading-start timing from the grouped individual buffers B1 to Bn is "the moment the buffer monitor unit 42 first detects that the data accumulated amount in any one of the individual buffers in the group reaches the reading-start threshold corresponding to the group." In other words, the reading-start timing is determined by the "OR condition" in the group.

Figure 16:
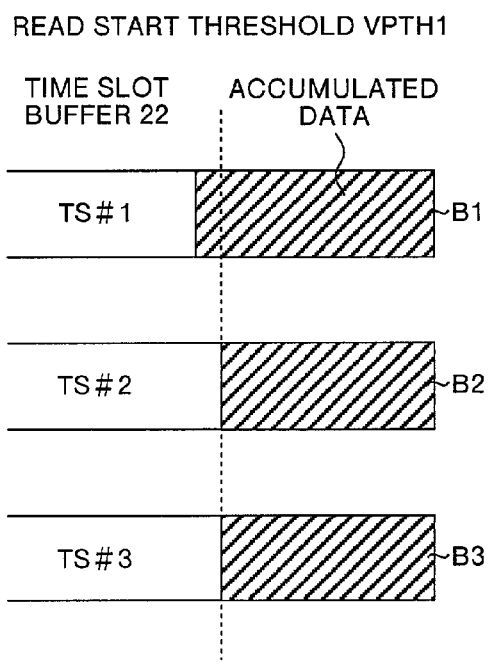
FIG. 16 is an explanatory diagram showing other method of determining reading-start timing in the third embodiment.

FIG. 16 is an explanatory diagram showing other method of determining reading-start timing in the third embodiment, in which three individual buffers B1 to B3 are grouped together same as in FIG. 15. As shown in the diagram, when the data accumulated amount in all individual buffers in the group reaches the reading-start threshold VPTH1, it is controlled to start reading from all of individual buffers B1 to B3 in the group. That is, the reading-start timing is "the moment the buffer monitor unit 42 first detects that the data accumulated amount in all of the individual buffers in the group reaches the reading-start threshold corresponding to the group." In other words, the reading-start timing is determined by the "AND condition" in the group.

Further, it may be defined to be "the moment the buffer monitor unit 42 first detects that the data accumulated amount in a specified number (an arbitrary number from one to all) of the individual buffers in the group reaches the reading-start threshold corresponding to the group." Thus, in the third embodiment, the reading-start timing can be determined easily in each virtual path 65, and the cost can be reduced.

Figure 17:
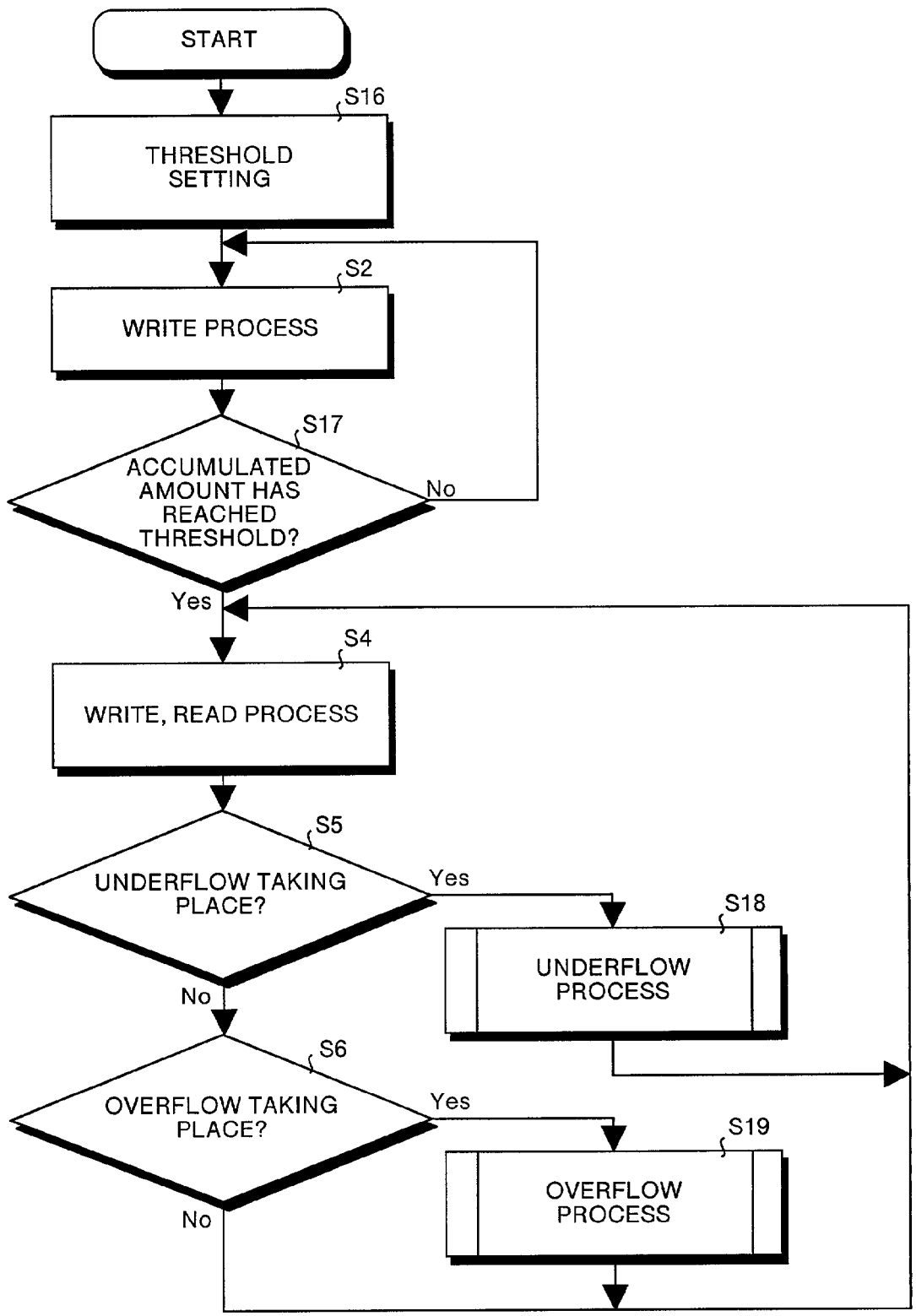
FIG. 17 is a flowchart showing flow of fluctuation absorption process in the third embodiment.

The operation of the third embodiment having such configuration is explained by referring to FIG. 17 to FIG. 20. Same parts as in the first embodiment are not explained, and only different parts are explained below. FIG. 17 is a flowchart showing flow of fluctuation absorption process in the third embodiment. Same parts as in FIG. 5 are identified with same reference numerals.

In the fluctuation absorption process in the third embodiment, instead of setting process of reading-start thresholds TH1 to THn at step S1, reading-start thresholds VPTH1 to VPTHm are set at step S16. Further, instead of judging whether the data accumulated amounts in the individual buffers B1 to Bn have reached the reading-start thresholds TH1 to THn or not at step S3, it is judged in each group whether the data accumulated amount in at least one individual buffer in the group has reaches the corresponding reading-start threshold or not at step S17. At step S17, meanwhile, it may be also judged in each group whether the data accumulated amount in all individual buffers in the same group has reached the respective corresponding reading-start threshold or not.

When communication is started, the buffer monitor unit 42 controls the write controller 13, and starts to write the data distributed in each time slot into the corresponding individual buffers B1 to Bn in the time slot buffer 22, and repeats writing only until the data accumulated amount in at least one individual buffer in the group reaches the corresponding reading-start threshold in each group (steps S2, S17). In any group, when the data accumulated amount in at least one individual buffer reaches the reading-start threshold corresponding to this group, reading of all individual buffers in this group is started (step S4).

Instead of the underflow process S7 and overflow process S8, the underflow process S18 and overflow process S19 mentioned below are executed. In FIG. 17, for the sake of explanation, step S16 is placed at the beginning of the flowchart, but setting of reading-start thresholds VPTH1 to VPTHm at step S1 is not required again if once set in the past communication. In the midst of communication, the reading-start thresholds VPTH1 to VPTHm may be changed (set again). As a result, the reading-start thresholds VPTH1 to VPTHm can be changed depending on the environments.

Figure 18:
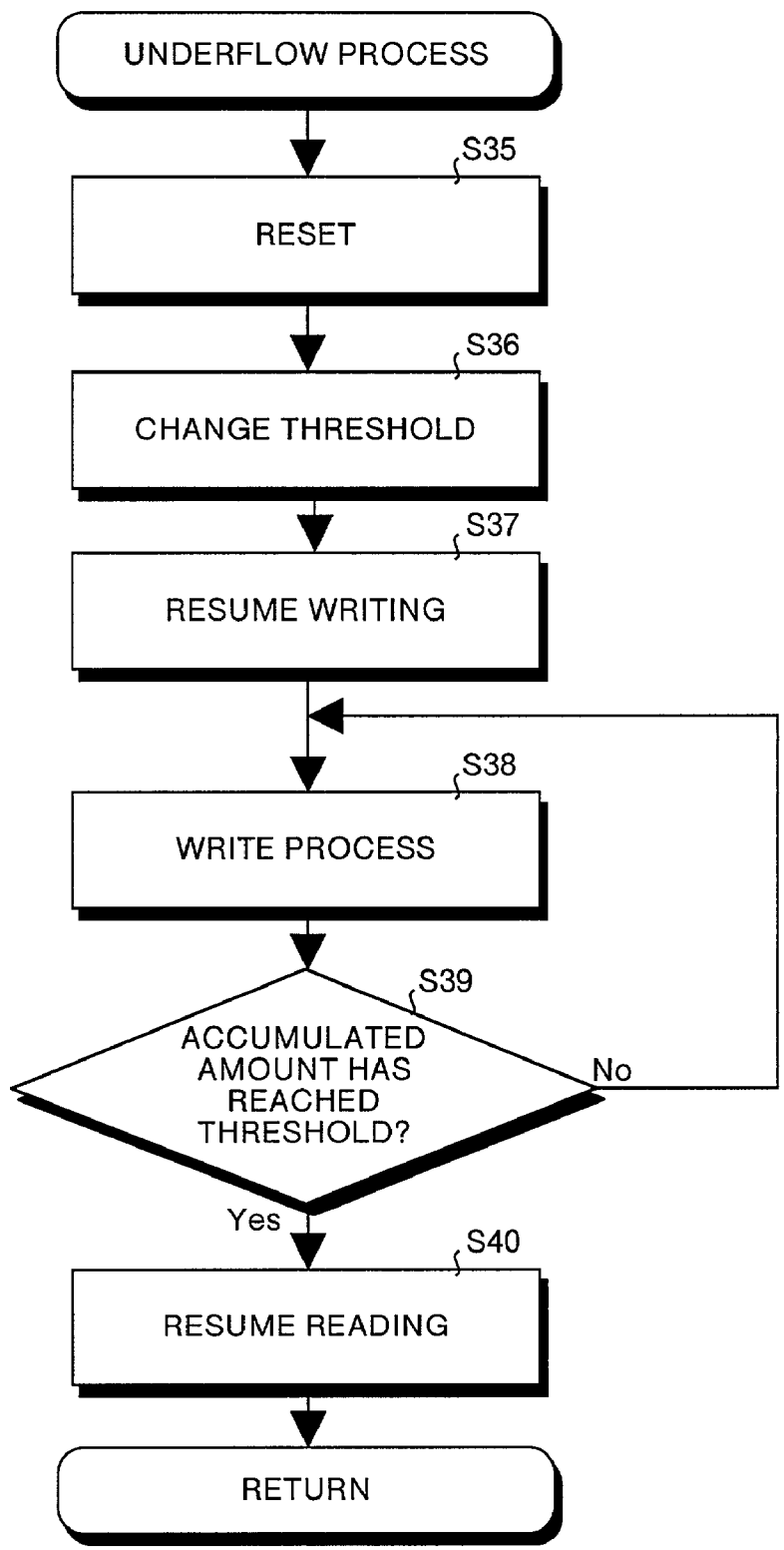
FIG. 18 is a flowchart showing flow of underflow process in the third embodiment.

The underflow process at step S18 is explained. FIG. 18 is a flowchart showing flow of underflow process in the third embodiment. In the underflow processing in the third embodiment, the buffer monitor unit 42 detecting occurrence of underflow in the individual buffers B1 to Bn first transmits the reset instruction for the individual buffers B1 to Bn having the underflow and all individual buffers (of a same group) corresponding to a same virtual path 65, to the fluctuation absorption buffer 11, and resets these individual buffers. The write operation instruction to the write controller 13 and read operation instruction to the read controller 15 are once turned off, and processing of writing and reading in these individual buffers is once stopped (step S35).

The reading-start threshold corresponding to this virtual path 65 (corresponding to this group) is increased by a specified amount (step S36). Writing is started by turning on the write operation instruction to the write controller 13 so that the data belonging to a same frame period may be accumulated uniformly at the beginning of these individual buffers (step S37). In this group, consequently, only writing is repeated in these individual buffers until the data accumulated amount in at least one individual buffer reaches again the reading-start threshold corresponding to this group (steps S38, S39). Herein, in this group, only writing may be repeated in these individual buffers until the data accumulated amount in all individual buffers reaches again the reading-start threshold corresponding to this group. Afterwards, in this group, when the data accumulated amount in at least one individual buffer reaches again the reading-start threshold corresponding to this group, reading of all individual buffers in this group is resumed (step S40).

Thus, if an underflow occurs in any one of the individual buffers (of a same group) corresponding to a same virtual path 65, all individual buffers corresponding to this virtual path 65 are reset, and writing and reading are stopped once, and then writing is started so that the data belonging to the same frame period may be accumulated uniformly at the beginning of these individual buffers, and further when the data accumulated amount in one or all of the individual buffers in this group reaches the reading-start threshold corresponding to this group, reading of all individual buffers in the group is resumed.

That is, in the underflow processing, after resetting all individual buffers corresponding to the same virtual path 65, the same operation as the operation right after start of communication is done. Besides, the reading-start threshold corresponding to the group having the underflow is automatically increased by a specified amount. That is, upon every occurrence of underflow, the fixed delay added to the data is automatically increased by a specific amount each.

Therefore, if an underflow occurs, a normal communication state is recovered promptly, and the fixed delay added to the data for fluctuation absorption can be automatically increased as required. The reading-start thresholds VPTH1 to VPTHm should not exceed the half value of the capacity of the individual buffers B1 to Bn. Fluctuations are composed of those in the delaying direction and others in advancing direction, which are considered to occur at same probability, and therefore if the reading-start thresholds VPTH1 to VPTHm exceed the half value of the capacity of the individual buffers B1 to Bn, the data may overflow from the individual buffers B1 to Bn.

Figure 19:
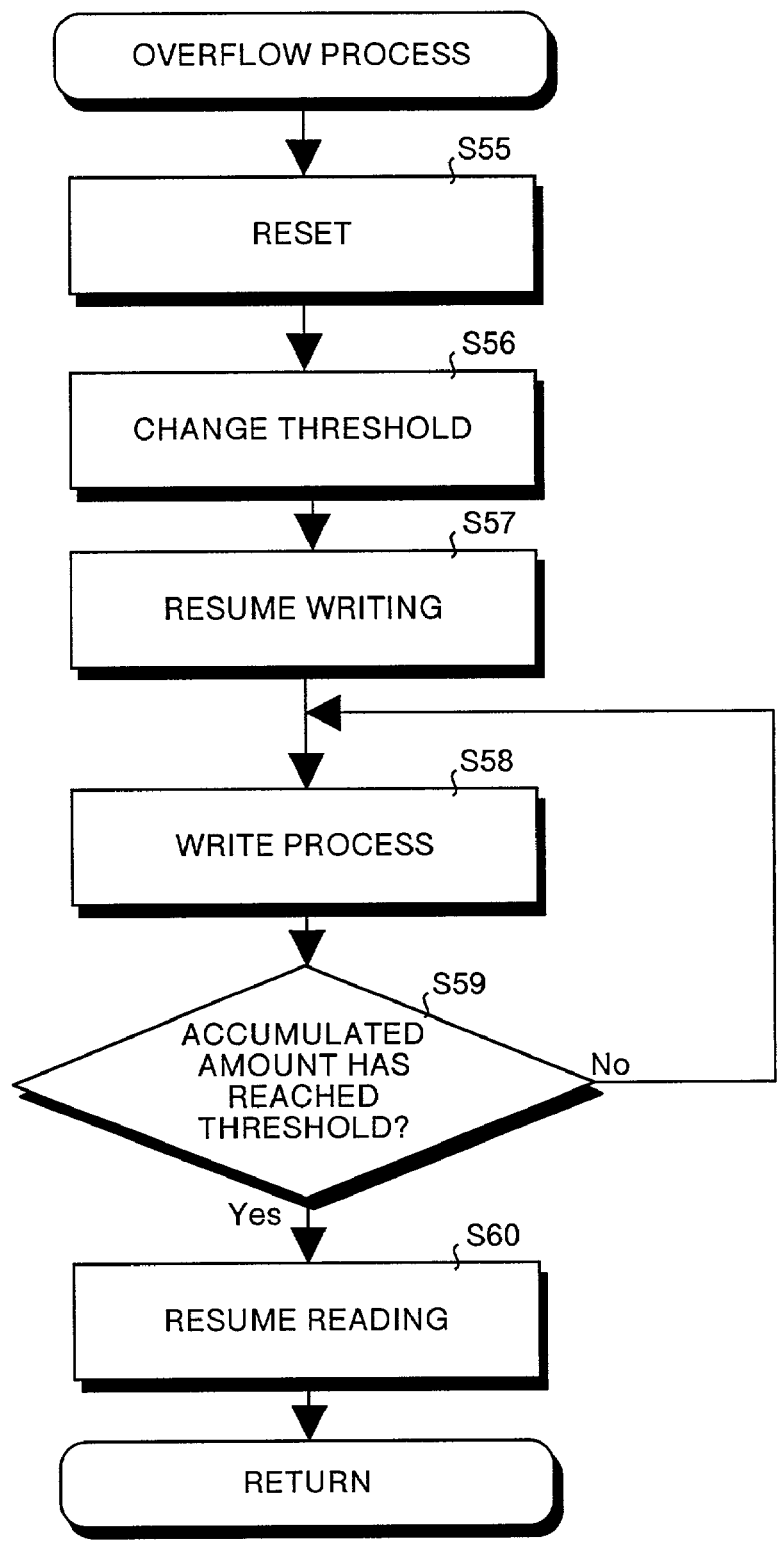
FIG. 19 is a flowchart showing flow of overflow process in the third embodiment.

The overflow process at step S19 is explained. FIG. 19 is a flowchart showing flow of overflow process in the third embodiment. In the overflow processing in the third embodiment, the buffer monitor unit 42 detecting occurrence of overflow in the individual buffers B1 to Bn first transmits the reset instruction for the individual buffer having the overflow and all individual buffers corresponding to a same virtual path 65, to the fluctuation absorption buffer 11, and resets these individual buffers. The write operation instruction to the write controller 13 and read operation instruction to the read controller 15 are once turned off, and processing of writing and reading in these individual buffers is once stopped (step S55).

The reading-start threshold corresponding to this virtual path 65 is increased by a specified amount (step S56). Writing is resumed by turning on the write operation instruction to the write controller 13 so that the data belonging to a same frame period may be accumulated uniformly at the beginning of these individual buffers B1 to Bn (step S57). In this group, consequently, only writing is executed in these individual buffers until the data accumulated amount in at least one individual buffer reaches again the reading-start threshold corresponding to this group (steps S58, S59).

Herein, in this group, only writing may be executed in these individual buffers until the data accumulated amount in all individual buffers reaches again the reading-start threshold corresponding to this group. Afterwards, in this group, when the data accumulated amount in at least one individual buffer reaches again the reading-start threshold corresponding to this group, reading of all individual buffers in this group is resumed (step S60).

Thus, if an overflow occurs in any one of the individual buffers (of a same group) corresponding to a same virtual path 65, all individual buffers corresponding to this virtual path 65 are reset, and writing and reading are stopped once, and then writing is started so that the data belonging to the same frame period may be accumulated uniformly at the beginning of these individual buffers, and further when the data accumulated amount in one or all of the individual buffers in this group reaches the reading-start threshold corresponding to this group, reading of all individual buffers in the group is resumed. Besides, the reading-start threshold corresponding to the group having the overflow is automatically increased by a specified amount. That is, upon every occurrence of underflow, the fixed delay added to the data is automatically increased by a specific amount each.

Figure 20:
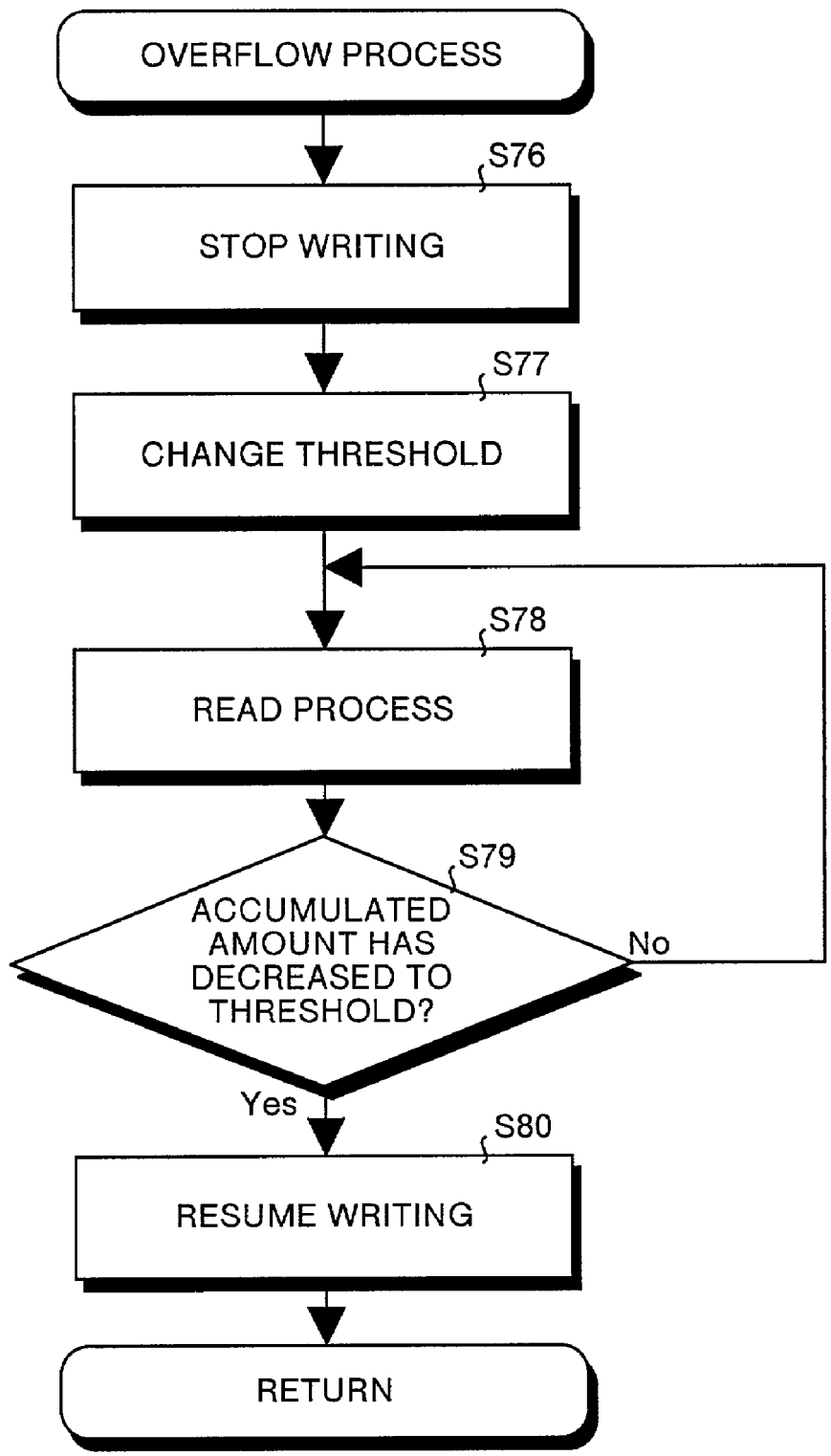
FIG. 20 is a flowchart showing other flow of overflow process in the third embodiment.

FIG. 20 is a flowchart showing other flow of overflow process in the third embodiment. In this overflow processing, the buffer monitor unit 42 detecting occurrence of overflow in the individual buffers B1 to Bn first stops writing turning off the write instruction once to the write controller 13, for the individual buffer having the overflow and all individual buffers (of a same group) corresponding to a same virtual path 65 (step S76). Then the reading-start threshold corresponding to this virtual path 65 is increased (step S77).

In this group, consequently, until the data accumulated amount in at least one individual buffer decreases again to the reading-start threshold corresponding to this group, only reading is executed in these individual buffers (steps S78, S79). Herein, in this group, only reading may be executed in these individual buffers until the data accumulated amount in all individual buffers decreases again to the reading-start threshold corresponding to this group. Afterwards, in this group, when the data accumulated amount in at least one individual buffer decreases again to the reading-start threshold corresponding to this group, writing of all individual buffers in this group is resumed (step S80).

Thus, if an overflow occurs in any one of the individual buffers corresponding to a same virtual path 65, writing in all individual buffers corresponding to this virtual path 65 is once stopped, and writing is resumed when the data accumulated amount in one or all of the individual buffers decreases again to the reading-start threshold. That is, in the event of an overflow, the write operation and read operation are reverse to the operation in the event of an underflow (mutually exchanging the write operation and read operation). Besides, the reading-start threshold corresponding to the group having the overflow is automatically increased by a specified amount. That is, upon every occurrence of overflow, the fixed delay added to the data is automatically increased by a specific amount each.

Therefore, if an overflow occurs, a normal communication state is recovered promptly, and the fixed delay added to the data for fluctuation absorption can be automatically increased as required. Further, if the threshold for overflow detection is set at 2 times of the reading-start thresholds VPTH1 to VPTHm, along with the elevation of reading-start thresholds VPTH1 to VPTHm, the threshold for overflow detection also climbs up, and the probability of overflow is lowered. The reading-start thresholds VPTH1 to VPTHm should not exceed the half value of the capacity of the individual buffers B1 to Bn. Fluctuations are composed of those in the delaying direction and others in advancing direction, which are considered to occur at same probability, and therefore if the reading-start thresholds VPTH1 to VPTHm exceed the half value of the capacity of the individual buffers B1 to Bn, the data may overflow from the individual buffers B1 to Bn.

Thus, according to the third embodiment, the same effects as in the first embodiment are obtained, and further those corresponding to a same virtual path 65 are grouped together and controlled to start reading at the same time, and it hence heightens the probability that the data to be issued in the same frame in the STM circuit interface 62 may be actually issued in the same frame.

In the third embodiment, the data accumulated amount is used as the trigger for starting reading, whereas in the fourth embodiment the trigger for starting reading is the lapse of time after start of communication. In the first to third embodiments, the value of the reading-start threshold or reading-start wait time held in the reading-start threshold setting unit or reading-start wait time setting unit can be "changed by the instruction of the user or manager of the device" by means of DIP switch or setting through a control bus from the device managing unit 75, but in the fourth embodiment, the value can be "changed automatically by measuring the maximum value of the delay fluctuations in every virtual path 65." That is, in the first to third embodiments, the values of the reading-start threshold or reading-start wait time is "semifixed," but it is "set automatically" in the fourth embodiment.

Figure 21:
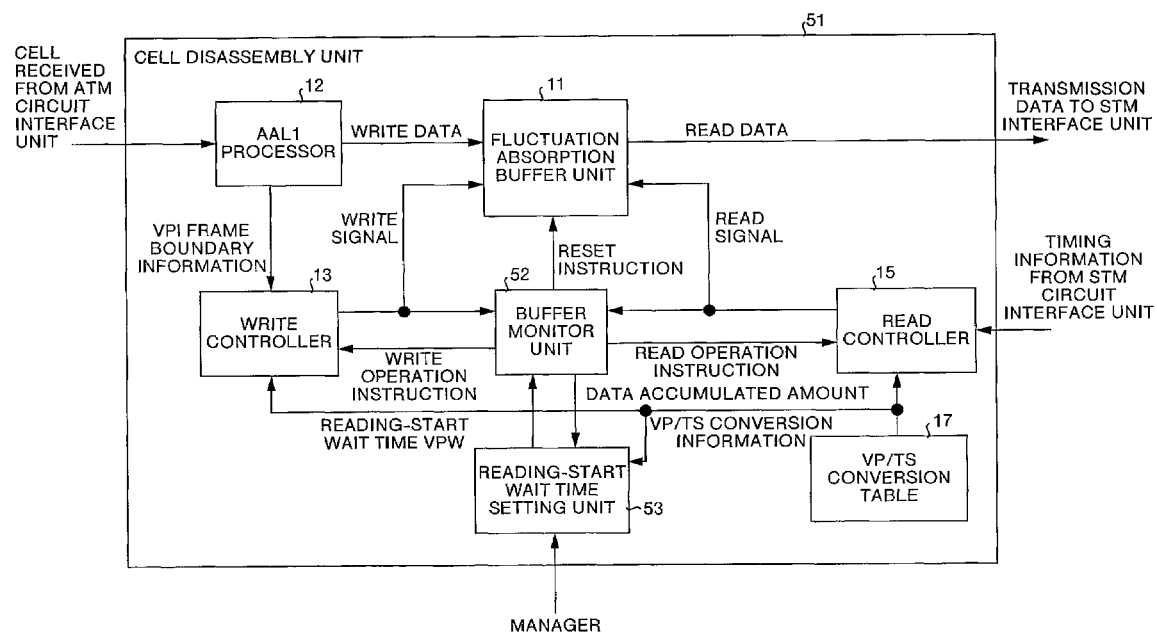
FIG. 21 is a functional block diagram showing a configuration of cell disassembly unit in a fourth embodiment of the invention.

The fourth embodiment is basically same as the third embodiment in configuration, and the explanation is omitted in the same parts, and only different parts are explained. FIG. 21 is a functional block diagram showing a configuration of cell disassembly unit in the fourth embodiment of the invention. Same parts as in FIG. 14 are identified with same reference numerals. A cell disassembly unit 51 in the fourth embodiment comprises a buffer monitor unit 52 and a reading-start wait time setting unit 53, in stead of the buffer monitor unit 42 and reading-start threshold setting unit 43 of the cell disassembly unit 41 in the third embodiment.

The reading-start wait time setting unit 53 is similar to the reading-start threshold setting unit 43 in the third embodiment in configuration and operation, except that reading-start wait times VPW1 to VPWm in each virtual path 65 are held instead of the reading-start thresholds VPTH1 to VPTHm, and are noticed to the buffer monitor unit 52.

The buffer monitor unit 52 is similar to the buffer monitor unit 42 in the third embodiment in configuration, but is partly different in operation. The buffer monitor unit 52 monitors the write signal from the write controller 13 in individual buffers B1 to Bn, determines the reading-start timing on the basis of the result, and controls to start reading at the same time by grouping together as for those corresponding to a same virtual path 65. For example, by monitoring the write signal, the communication start timing of each one of individual buffers B1 to Bn is detected, and when communication is started, internal timers T1 to Tn, not shown, provided in individual buffers B1 to Bn are started to measure the lapse of time from start of communication. The result of measurement of lapse of time and reading-start wait times VPW1 to VPWm from the reading-start wait time setting unit 53 are compared, and the write operation instruction is kept ON and the read operation instruction is kept OFF until the lapse of time reaches VPW1 to VPWm.

The read operation instruction is turned on simultaneously in all buffers in the same group. The timing for turning on the read operation instruction (reading-start timing) may be either the moment the lapse of time after start of communication reaches the reading-start wait time in any one of the buffers in the group, or the moment the lapse of time after start of communication reaches the reading-start wait time in all of the buffers in the group.

The buffer monitor unit 52, after the reading-start timing is determined, continues to monitor the data accumulated amount in the individual buffers B1 to Bn, and notices to the reading-start wait time setting unit 53. If an underflow or overflow is detected, it is noticed to the reading-start wait time setting unit 53. Receiving the notice of underflow or overflow, the reading-start wait time setting unit 53 extends the held reading-start wait times VPW1 to VPWm by a specified time.

Setting or changing of reading-start wait times VPW1 to VPWm in the reading-start wait time setting unit 53 may be operated either by the user or manager by using DIP switch or the like same as in the first to third embodiments, or by the reading-start wait time setting unit 53 for measuring the maximum value (effective value D') of delay fluctuations in every virtual path 65 for changing automatically on the basis of the result.

In the latter case, the reading-start wait time setting unit 53 monitors the information of data accumulated amount of individual buffers B1 to Bn sent from the buffer monitor unit 52, and calculates the effective value D1 of delay fluctuations in every virtual path 65 from the amount of variations. Later, on the basis of the calculated effective amount D1, the reading-start wait times VPW1 to VPWm are changed (optimized) to a minimum value not to induce overflow or underflow. As a result, the fixed delay added to the data for fluctuation absorption in the cell disassembly unit 51 can be automatically suppressed to a minimum limit, and appropriate communication is realized.

After the read operation from the time slot buffer 22 has been started, however, if the values of the reading-start wait times VPW1 to VPWm are changed according to the same procedure, there is basically no effect on the operation of the cell disassembly unit 51. Accordingly, the optimized value is applied actually only when the same virtual path 65 is set again after the virtual path 65 is once disconnected, or when an overflow or underflow occurs. Or, in order that the optimized value may be applied instantly, the fluctuation absorption buffer unit 11 may be once reset by force.

Figure 22:
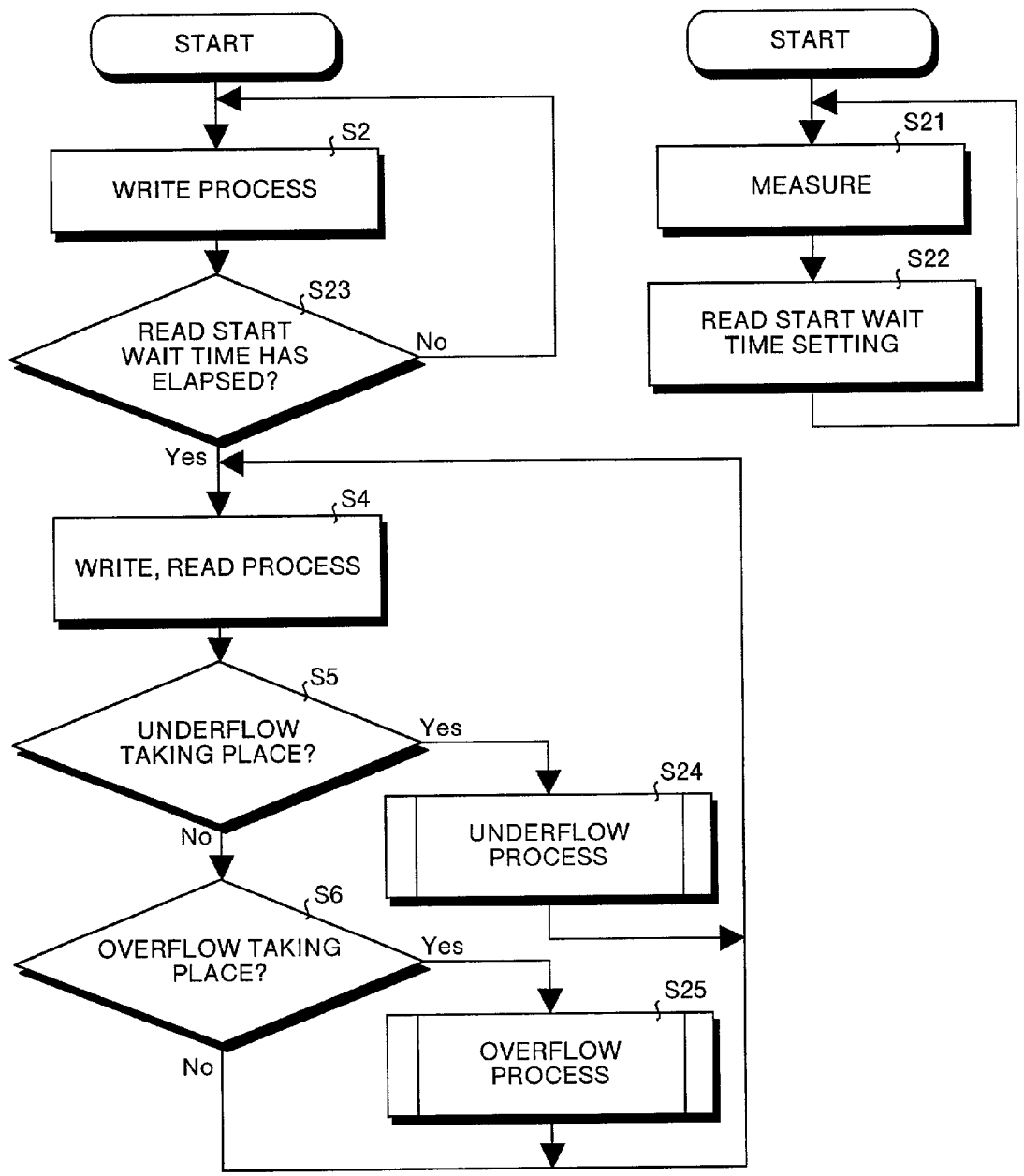
FIG. 22 is a flowchart showing flow of fluctuation absorption process in the fourth embodiment.

In the fourth embodiment having such configuration, the operation is explained by referring to the flowcharts in FIG. 22 to FIG. 25. Same parts as in the first embodiment are not explained, and only different parts are explained herein. FIG. 22 is a flowchart showing flow of fluctuation absorption process in the fourth embodiment. Same parts as in FIG. 17 are identified with same reference numerals.

In the fluctuation absorption process in the fourth embodiment, instead of the setting process of reading-start thresholds VPTH1 to VPTHm at step S16, step S21 and step S22 are processed. That is, the reading-start wait time setting unit 53 monitors the information of the data accumulated amount of individual buffers B1 to Bn transmitted from the buffer monitor unit 52, and calculates the effective value D' of delay fluctuations in every virtual path 65 from the amount of variations (step S21), and sets the reading-start wait times VPW1 to VPWm on the basis of the calculated effective value D1 (step S22). This process is repeated parallel to other processes during communication, and the reading-start wait times VPW1 to VPWm are updated from time to time.

At step S17, in each group, instead of judging if the data accumulated amount in at least one individual buffer in the same group has reached the corresponding reading-start threshold or not, it is judged, at step S23, in each group, if the lapse of time after start of communication in at least one individual buffer in the same group has reached the corresponding reading-start wait time or not. Or, herein, it may be also judged if the lapse of time after start of communication in all of individual buffers in the same group has reached the corresponding reading-start wait time or not.

That is, when communication is started, the buffer monitor unit 52 controls the write controller 13, and starts to write the data distributed in each time slot into the corresponding individual buffers B1 to Bn in the time slot buffer 22, and repeats writing only until the lapse of time after start of communication in at least one individual buffer in the group reaches the corresponding reading-start wait time (steps S2, S23). In any group, when the lapse of time after start of communication in at least one individual buffer reaches the reading-start wait time corresponding to this group, reading of all individual buffers in this group is started (step S4). Besides, instead of the underflow process S18 and overflow process S19, the underflow process S24 and overflow process S25 mentioned below are executed.

Figure 23:
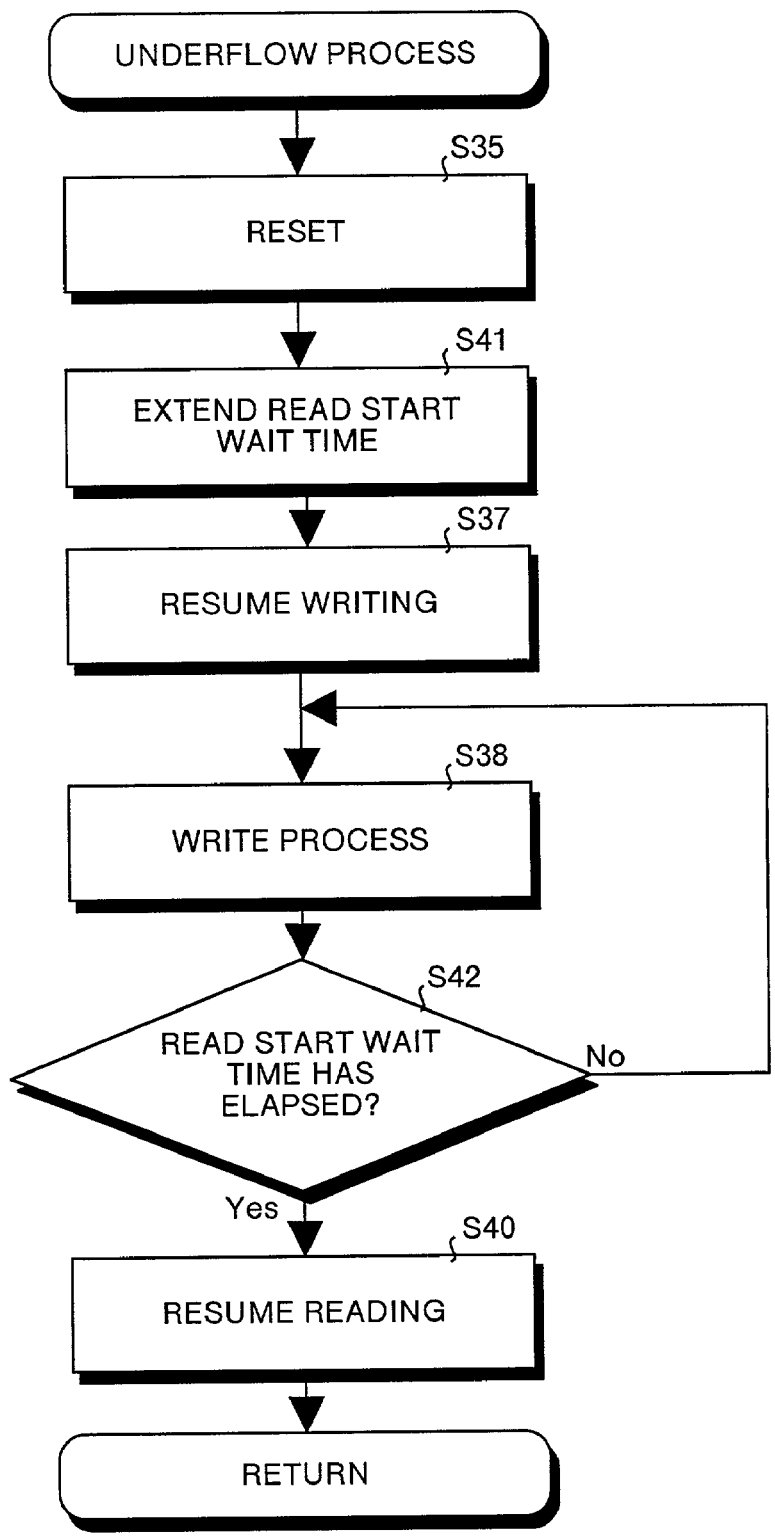
FIG. 23 is a flowchart showing flow of underflow process in the fourth embodiment.

The underflow process at step S24 is explained. FIG. 23 is a flowchart showing flow of underflow process in the fourth embodiment. Same parts as in FIG. 18 are identified with same reference numerals. In the underflow processing in the fourth embodiment, instead of the process of increasing the reading-start threshold at step S36, the reading-start wait time is extended by a specified time at step S41. Further, instead of step S39 for judging if the data accumulated amount in at least one individual buffer in the group having the underflow has reached the reading-start threshold corresponding to the group or not, it is judged at step S42 if passing over the reading-start wait time corresponding to the group having the underflow after executing of resetting at step S35.

That is, after resetting at step S35, the buffer monitor unit 52 extends the reading-start wait time corresponding to the group having the underflow by a specified time (step S41). After exudation of resetting, until passing over the reading-start wait time corresponding to this group, only writing is executed in the individual buffers in this group (steps S38, S42), and then reading is resumed (step S40).

Figure 24:
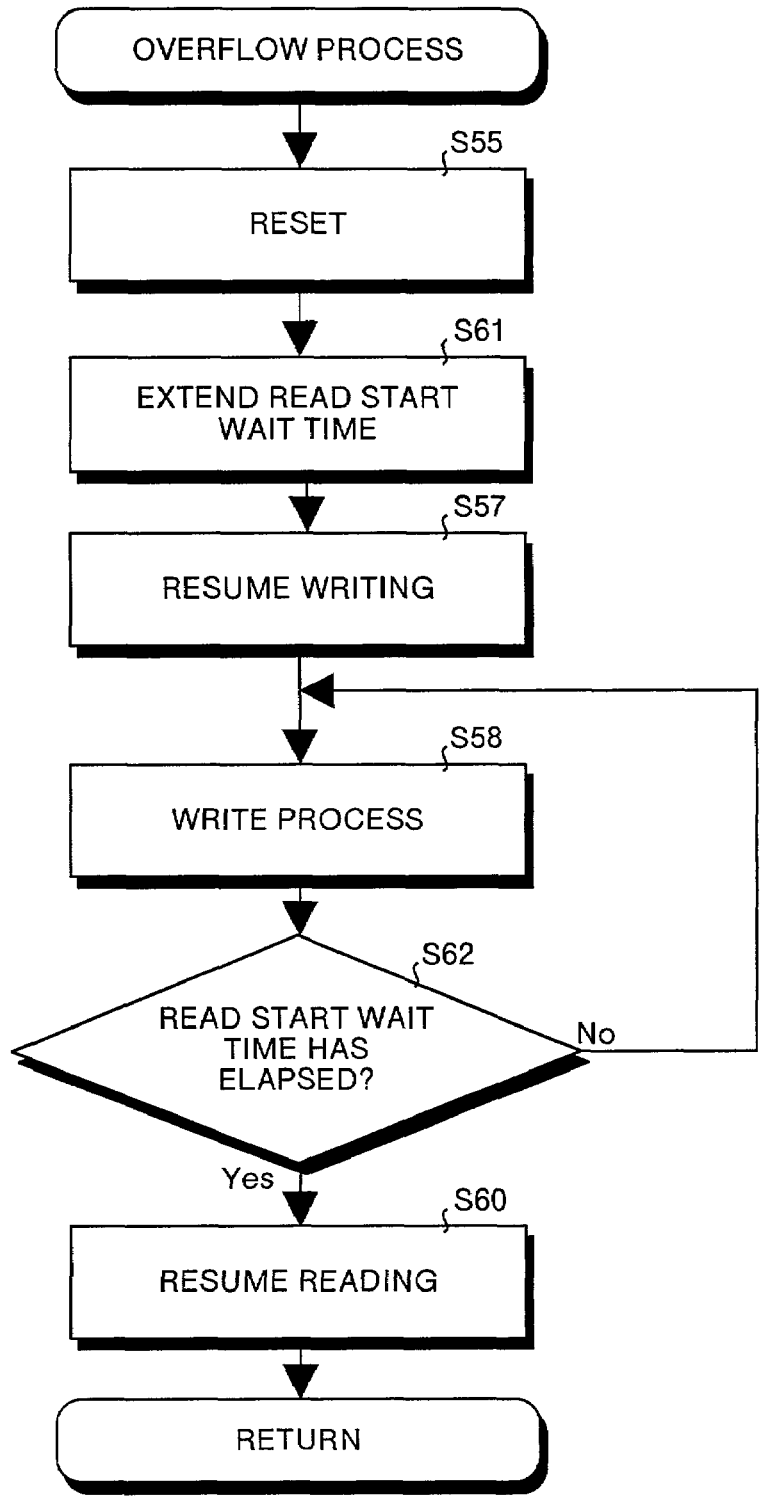
FIG. 24 is a flowchart showing flow of overflow process in the fourth embodiment.

The overflow process at step S25 is explained. FIG. 24 is a flowchart showing flow of overflow process in the fourth embodiment. Same parts as in FIG. 19 are identified with same reference numerals. In the overflow processing in the fourth embodiment, instead of the process of increasing the reading-start threshold at step S56, the reading-start wait time is extended by a specified time at step S61. Further, instead of step S59 for judging if the data accumulated amount in at least one individual buffer in the group having the overflow has reached the reading-start threshold corresponding to the group or not, it is judged at step S62 if passing over the reading-start wait time corresponding to the group having the overflow after executing of resetting at step S55.

That is, after resetting at step S55, the buffer monitor unit 52 extends the reading-start wait time corresponding to the group having the overflow by a specified time (step S61). After execution of resetting, until passing over the reading-start wait time corresponding to this group, only writing is executed in the individual buffers in this group (steps S58, S62), and then reading is resumed (step S60).

Figure 25:
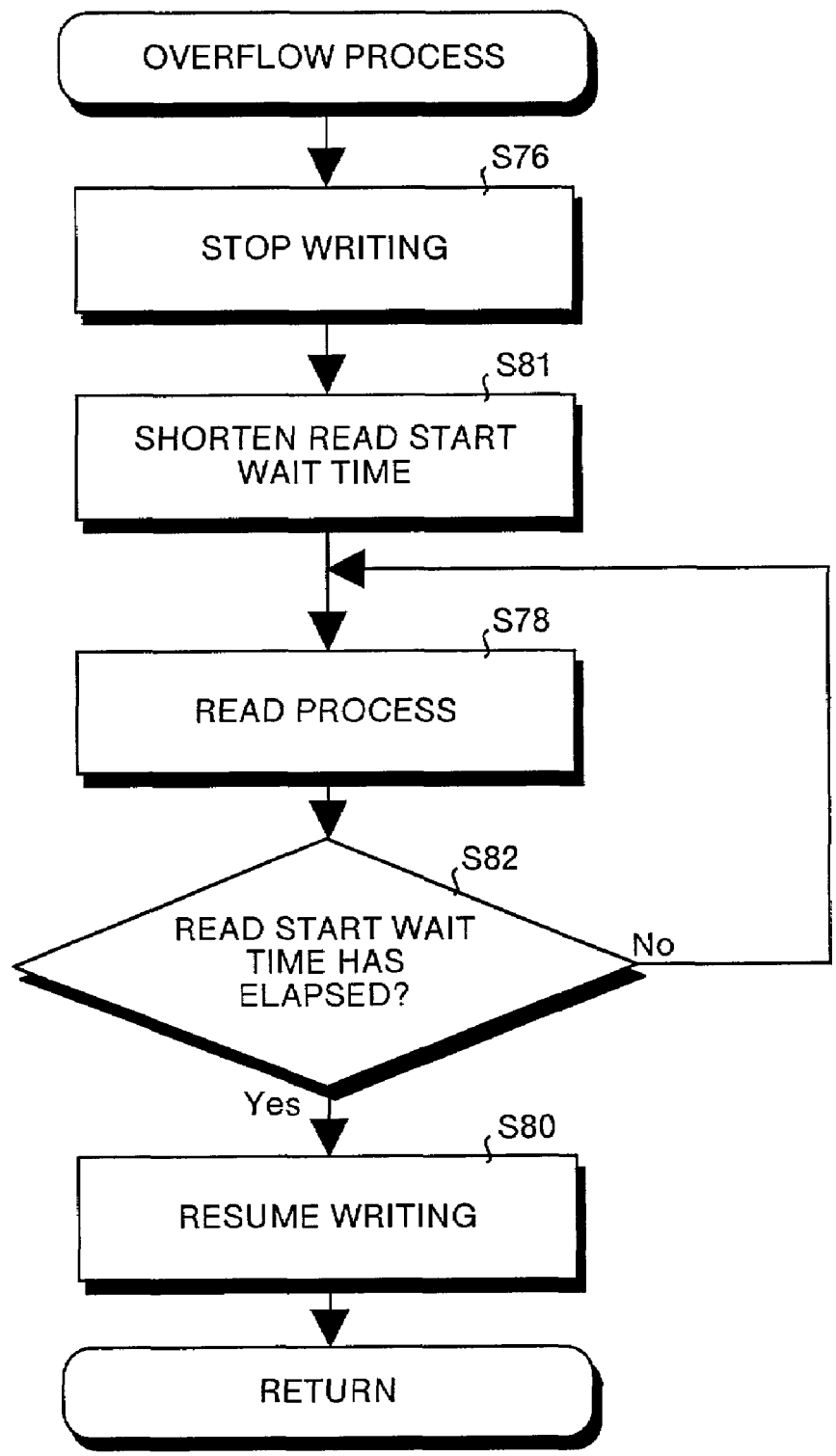
FIG. 25 is a flowchart showing other flow of overflow process in the fourth embodiment.

FIG. 25 is a flowchart showing other flow of overflow process in the fourth embodiment. Same parts as in FIG. 20 are identified with same reference numerals. In this overflow processing, instead of the process of increasing the reading-start threshold at step S77, the reading-start wait time is shortened by a specified time at step S81. Further, instead of step S79 for judging if the data accumulated amount in at least one individual buffer in the group having the overflow has reached the reading-start threshold corresponding to the group or not, it is judged at step S82 if passing over the reading-start wait time corresponding to the group having the overflow after occurrence of overflow.

That is, after stopping writing at step S76, the buffer monitor unit 52 shortens the reading-start wait time corresponding to the group having the overflow is extended by a specified time (step S81). After occurrence of overflow, until passing over the reading-start wait time corresponding to this group, only reading is executed in the individual buffers in this group (steps S78, S82), and then writing is resumed (step S80).

According to the fourth embodiment, as described herein, same effects as in the third embodiment are obtained, and moreover by measuring the effective value D', and changing (optimizing) the reading-start wait times VPW1 to VPWm so as to be a minimum value not to induce overflow or underflow according to the result, the fixed delay added to the data for fluctuation absorption in the cell disassembly unit 51 can be automatically suppressed to a minimum limit, and adequate communication is realized.

This process of optimizing by measuring the effective value D1 can be also applied in the first to third embodiments, and the same effects as in the fourth embodiment can be obtained. In this case, in the first embodiment, the reading-start threshold setting unit 16 optimizes the reading-start thresholds TH1 to THn, in the second embodiment, the reading-start wait time setting unit 33 optimizes the reading-start wait times W1 to Wn, and in the third embodiment, the reading-start threshold setting unit 43 optimizes the reading-start thresholds VPTH1 to VPTHm.

In the first to third embodiments, the data interface width between functional blocks is 8 bits and data is transferred in byte units, but same effects are obtained by the different data interface widths or transfer units. The STM interface speed and ATM interface speed are not particularly limited, and may be any speed. The ATM cell is used as the basic transfer unit, but similar effects are obtained by other transfer units such as packets of different kinds or lengths other than the ATM cells. As the specific transfer method of data on the STM circuit interface 62 by cells through the ATM network 63, the structured data transfer method designated in ITU-T Recommendation I.363.1 is used, but other transfer method having similar function may be also employed.

As described herein, according to one aspect of this invention, the cell disassembly unit stores the data distributed in each time slot temporarily in the buffer provided in each time slot, and absorbs fluctuations of the cell. Therefore, fluctuations can be absorbed in each time slot constant in communication speed, and the capacity of each buffer is always enough at the minimum capacity (the capacity enough to accommodate communication speed in each time slot) regardless of the communication speed of virtual path, and the memory is composed in a simple structure, thereby suppressing both increase of total capacity of memory for absorbing fluctuations and complication of memory circuit, and reducing the cost.

According to another aspect of this invention, the cell disassembly unit accumulates data after start of communication by writing data distributed in each time slot into the buffer, reads out the data from the buffer, parallel to writing, when the data accumulated amount in the buffer reaches a prescribed amount, and sends out the read data to the STM circuit interface, and therefore, fluctuations can be absorbed in a simple procedure.

According to still another aspect of this invention, the cell disassembly unit accumulates data after start of communication by writing data distributed in each time slot into the buffer, reads out the data from the buffer, parallel to writing, when passing a first prescribed amount, and sends out the read data to the STM circuit interface, and therefore, fluctuations can be absorbed in a simple procedure.

According to still another aspect of this invention, the prescribed amount or first prescribed time can be set by the setting unit. Therefore, the prescribed amount or first prescribed time can be adjusted depending on the environments of use, thereby decreasing addition of fixed delay more than necessary or overflow or underflow, and realizing adequate communication.

According to still another aspect of this invention, the measuring unit measures fluctuations of the cell, and the setting unit sets the value of the prescribed amount or first prescribed time on the basis of the result of measurement by the measuring unit. Therefore, the prescribed amount or first prescribed time can be adjusted automatically and appropriately, so that an adequate communication is realized.

According to still another aspect of this invention, the prescribed amount or first prescribed time is present independently in each buffer, and the cell disassembly unit determines the reading-start timing from the buffer independently in each buffer, and therefore the reading-start timing can be controlled finely in each buffer.

According to still another aspect of this invention, the prescribed amount or first prescribed time is present independently in each virtual path, and the cell disassembly unit determines the reading-start timing from the buffer independently in every one or two or more buffers corresponding to each virtual path, and therefore it is higher in probability that the data to be issued in a same frame is actually issued in the same frame, thereby realizing adequate communication.

According to still another aspect of this invention, the cell disassembly unit starts reading action from all buffers corresponding to the virtual path when the data accumulated amount reaches the prescribed amount or passing the prescribed first time from start of communication, in more than a specified number, for example, one or more of buffers out of one or two or more buffers corresponding to a same virtual path. Therefore, in a simple method, the reading-start timing in every one or two or more buffers corresponding to each virtual path can be controlled.

According to still another aspect of this invention, the cell disassembly unit starts reading action from all buffers corresponding to the virtual path when the data accumulated amount reaches the prescribed amount or passing the prescribed first time from start of communication, in all buffers out of one or two or more buffers corresponding to a same virtual path, and therefore, in a simple method, the reading-start timing in every one or two or more buffers corresponding to each virtual path can be controlled.

According to still another aspect of this invention, the cell disassembly unit once stops, when an underflow occurs in the buffer, reading out from the buffer having the underflow, and resumes reading out when the data accumulated amount reaches again the prescribed amount or passing a second prescribed time after occurrence of underflow, and therefore if an underflow occurs, a normal communication can be recovered promptly, thereby realizing adequate communication.

According to still another aspect of this invention, the cell disassembly unit, when an underflow occurs in any one of one or two or more buffers corresponding to a same virtual path, resets all buffers corresponding to this virtual path, and once stops writing and reading in these buffers, and resumes writing so that the data belonging to a same frame period may be accumulated uniformly at the beginning of these buffers, and resumes reading out when the data accumulated amount in these buffers reaches again the prescribed amount or passing a second prescribed time after execution of resetting, and therefore if an underflow occurs, a normal communication can be recovered promptly, thereby realizing adequate communication.

According to still another aspect of this invention, the cell disassembly unit resets, when an overflow occurs in the buffer, the buffer having the overflow, once stops reading out from this buffer, and resumes reading out when the data accumulated amount reaches again the prescribed amount or passing a second prescribed time after execution of resetting, and therefore if an overflow occurs, a normal communication can be recovered promptly, thereby realizing adequate communication.

According to still another aspect of this invention, the cell disassembly unit, when an overflow occurs in any one of one or two or more buffers corresponding to a same virtual path, resets all buffers corresponding to this virtual path, and once stops writing and reading in these buffers, and resumes writing so that the data belonging to a same frame period may be accumulated uniformly at the beginning of these buffers, and resumes reading out when the data accumulated amount in these buffers reaches again the prescribed amount or passing a second prescribed time after execution of resetting, and therefore if an overflow occurs, a normal communication can be recovered promptly, thereby realizing adequate communication.

According to still another aspect of this invention, the cell disassembly unit once stops, when an overflow occurs in the buffer, writing into the buffer having the overflow, and resumes writing when the data accumulated amount in this buffer decreases to the prescribed amount or passing a second prescribed time after occurrence of overflow, and therefore if an overflow occurs, a normal communication can be recovered promptly, thereby realizing adequate communication.

According to still another aspect of this invention, the cell disassembly unit once stops, when an overflow occurs in the buffer, writing into the buffer having the overflow, and resumes writing when the data accumulated amount in this buffer decreases to the prescribed amount or passing a second prescribed time after occurrence of overflow, and therefore if an overflow occurs, a normal communication can be recovered promptly, and therefore if an overflow occurs, a normal communication can be recovered promptly, thereby realizing adequate communication.

According to still another aspect of this invention, the increasing or extending unit increases the prescribed amount or extends the second prescribed time when an underflow occurs in the buffer. Therefore, recurrence of underflow can be automatically decreased, thereby realizing adequate communication.

According to still another aspect of this invention, the increasing or extending unit increases the prescribed amount or extends the second prescribed time when an overflow occurs in the buffer. Therefore, recurrence of overflow can be automatically decreased, thereby realizing adequate communication.

According to still another aspect of this invention, the storing step stores the data distributed in each time slot temporarily in the buffer provided in each time slot, and absorbs fluctuations of the cell. Therefore, fluctuations can be absorbed in each time slot constant in communication speed, and the capacity of each buffer is always enough at the minimum capacity (the capacity enough to accommodate communication speed in each time slot) regardless of the communication speed of virtual path, and the memory is composed in a simple structure, thereby suppressing both increase of total capacity of memory for absorbing fluctuations and complication of memory circuit, and reducing the cost.

According to still another aspect of this invention, the accumulating step accumulates data after start of communication by writing data distributed in each time slot into the buffer, the reading and writing step reads out the data from the buffer, parallel to writing, when the data accumulated amount in the buffer at the accumulating step reaches a prescribed amount, and the sending step sends out the read data to the STM circuit interface. Therefore, fluctuations can be absorbed in a simple procedure.

According to still another aspect of this invention, the accumulating step accumulates data after start of communication by writing data distributed in each time slot into the buffer, the reading and writing step reads out the accumulated data, parallel to writing, when the data is accumulated for a first prescribed time at the accumulating step, and the sending step sends out the data read out at the reading and writing step to the STM circuit interface, and therefore, fluctuations can be absorbed in a simple procedure.

According to still another aspect of this invention, the prescribed amount or first prescribed time can be set at the setting step. Therefore, the prescribed amount or first prescribed time can be adjusted depending on the environments of use, thereby decreasing addition of fixed delay more than necessary or overflow or underflow, and realizing adequate communication.

According to still another aspect of this invention, the measuring step measures fluctuations of the cell, and the setting step sets the value of the prescribed amount or first prescribed time on the basis of the result of measurement at the measuring step. Therefore, the prescribed amount or first prescribed time can be adjusted automatically and appropriately, thereby realizing a more adequate communication.

According to still another aspect of this invention, the prescribed amount or first prescribed time is present independently in each buffer, and the reading and writing step determines the reading-start timing from the buffer independently in each buffer, and therefore the reading-start timing can be controlled finely in each buffer.

According to still another aspect of this invention, the prescribed amount or first prescribed time is present independently in each virtual path, and the reading and writing step determines the reading-start timing from the buffer independently in every one or two or more buffers corresponding to each virtual path, and therefore it is higher in probability that the data to be issued in a same frame is actually issued in the same frame.

According to still another aspect of this invention, the reading and writing step starts reading action from all buffers corresponding to the virtual path when the data accumulated amount reaches the prescribed amount or passing the prescribed first time from start of communication, in more than a specified number, for example, one or more of buffers out of one or two or more buffers corresponding to a same virtual path. Therefore, in a simple method, the reading-start timing in every one or two or more buffers corresponding to each virtual path can be controlled.

According to still another aspect of this invention, the reading and writing step starts reading action from all buffers corresponding to the virtual path when the data accumulated amount reaches the prescribed amount or passing the prescribed first time from start of communication, in all buffers out of one or two or more buffers corresponding to a same virtual path, and therefore, in a simple method, the reading-start timing in every one or two or more buffers corresponding to each virtual path can be controlled.

According to still another aspect of this invention, the reading and writing step once stops, when an underflow occurs in the buffer, reading out from the buffer having the underflow, and resumes reading out when the data accumulated amount reaches again the prescribed amount or passing a second prescribed time after occurrence of underflow, and therefore if an underflow occurs, a normal communication can be recovered promptly, thereby realizing adequate communication.

According to still another aspect of this invention, the reading and writing step, when an underflow occurs in any one of one or two or more buffers corresponding to a same virtual path, resets all buffers corresponding to this virtual path, and once stops writing and reading in these buffers, and resumes writing so that the data belonging to a same frame period may be accumulated uniformly at the beginning of these buffers, and resumes reading out when the data accumulated amount in these buffers reaches again the prescribed amount or passing a second prescribed time after execution of resetting, and therefore if an underflow occurs, a normal communication can be recovered promptly, thereby realizing adequate communication.

According to still another aspect of this invention, the reading and writing step resets, when an overflow occurs in the buffer, the buffer having the overflow, once stops reading out from this buffer, and resumes reading out when the data accumulated amount reaches again the prescribed amount or passing a second prescribed time after execution of resetting, and therefore if an overflow occurs, a normal communication can be recovered promptly, thereby realizing adequate communication.

According to still another aspect of this invention, the reading and writing step, when an overflow occurs in any one of one or two or more buffers corresponding to a same virtual path, resets all buffers corresponding to this virtual path, and once stops writing and reading in these buffers, and resumes writing so that the data belonging to a same frame period may be accumulated uniformly at the beginning of these buffers, and resumes reading out when the data accumulated amount in these buffers reaches again the prescribed amount or passing a second prescribed time after execution of resetting, and therefore if an overflow occurs, a normal communication can be recovered promptly, thereby realizing adequate communication.

According to still another aspect of this invention, the reading and writing step once stops, when an overflow occurs in the buffer, writing into the buffer having the overflow, and resumes writing when the data accumulated amount in this buffer decreases to the prescribed amount or passing a second prescribed time after occurrence of overflow, and therefore if an overflow occurs, a normal communication can be recovered promptly, thereby realizing adequate communication.

According to still another aspect of this invention, the reading and writing step once stops, when an overflow occurs in the buffer, writing into the buffer having the overflow, and resumes writing when the data accumulated amount in this buffer decreases to the prescribed amount or passing a second prescribed time after occurrence of overflow, and therefore if an overflow occurs, a normal communication can be recovered promptly, and therefore if an overflow occurs, a normal communication can be recovered promptly, thereby realizing adequate communication.

According to still another aspect of this invention, the increasing or extending step increases the prescribed amount or extends the second prescribed time when an underflow occurs in the buffer, and therefore, recurrence of underflow can be automatically decreased, thereby realizing adequate communication.

According to still another aspect of this invention, the increasing or extending step increases the prescribed amount or extends the second prescribed time when an overflow occurs in the buffer, and therefore, occurrence of underflow can be automatically decreased, thereby realizing adequate communication.

According to still another aspect of this invention, a same prescribed time can be defined for the first prescribed time and second prescribed time. Therefore, in the event of overflow or underflow, when the second prescribed time is extended, the first prescribed time is also extended, thereby decreasing occurrence of under flow after start of communication.

According to still another aspect of this invention, since the method of the invention can be executed by the computer, both increase of total capacity of the memory for absorbing fluctuations and complication of memory control circuit can be suppressed, so that the cost can be reduced.

INDUSTRIAL APPLICABILITY

As described herein, the cell disassembly device, cell disassembly method, and computer-readable recording medium recording a program for executing this method by a computer are suited to transmission and reception of effective data (effective time slot) on the STM circuit having plural time slots (TS) divided and multiplexed in time in the frame period through ATM network, by using structured data transfer (SDT) method or the like designated in the ITU-T Recommendation, and are further useful for suppressing both increase of total capacity of memory for absorbing fluctuations and complication of memory control circuit, and reducing the cost.

The invention claimed is:

1. A cell disassembly device comprising:
   a cell disassembly unit which disassembles an ATM cell received from an ATM circuit interface, extract data from payload, distributes data in plural STM time slots according to a sender, and sends out the distributed data to an STM circuit interface; and
   a buffer unit, which includes an input stage and an independent STM buffer for each STM time slot, wherein the input stage converts between ATM and STM timing, and each STM buffer operates according to STM timing, wherein said cell disassembly unit stores the data distributed in each STM time slot temporarily in said STM buffer, and absorbs fluctuations of transferring the ATM cell to the STM time slots.

2. The cell disassembly device according to claim 1, wherein said cell disassembly unit accumulates data after start of communication by writing data distributed in each STM time slot into the corresponding STM buffer, reads out the data from said STM buffer, parallel to writing, when the data accumulated amount in said STM buffer reaches a prescribed amount, and sends out the read data to said STM circuit interface.

3. The cell disassembly device according to claim 2, further comprising a setting unit which sets the prescribed amount or a first prescribed time for reading out data from said STM buffer.

4. The cell disassembly device according to claim 3, further comprising a measuring unit which measures fluctuations of the ATM cell, wherein said setting unit sets the value of the prescribed amount or first prescribed time on the basis of the result of measurement by said measuring unit.

5. The cell disassembly device according to claim 2, wherein the prescribed amount or first prescribed time is set independently for each STM buffer, and said cell disassembly unit determines the reading-start timing independently in each STM buffer.

6. The cell disassembly device according to claim 2, wherein the prescribed amount or first prescribed time is set independently for each virtual path, and said cell disassembly unit determines the reading-start timing independently for each set of one or more STM buffers corresponding to each respective virtual path.

7. The cell disassembly device according to claim 6, wherein said cell disassembly unit starts reading out data from all STM buffers in said buffer unit corresponding to a same virtual path when the data accumulated amount reaches the prescribed amount or when the prescribed first time passes from the start of communication in more than a specified number of STM buffers corresponding to the same virtual path.

8. The cell disassembly device according to claim 6, wherein said cell disassembly unit starts reading out data from all STM buffers in said buffer unit corresponding to a same virtual path when the data accumulated amount reaches the prescribed amount or when the prescribed first time passes from the start of communication in all STM buffers corresponding to the same virtual path.

9. The cell disassembly device according to claim 2, wherein said cell disassembly unit stops, when an underflow occurs in one of the STM buffers, reading out from the STM buffer having the underflow, and resumes reading out when the data accumulated amount reaches again the prescribed amount or when a second prescribed time passes after occurrence of the underflow.

10. The cell disassembly device according to claim 1, wherein said cell disassembly unit accumulates data after start of communication by writing data distributed in each STM time slot into one of said STM buffers, reads out the data from said STM buffer, parallel to writing, after a first prescribed time passes, and sends out the read data to the STM circuit interface.

11. The cell disassembly device according to claim 10, further comprising a setting unit which sets a prescribed amount or the first prescribed time for reading out the data from said STM buffer.

12. The cell disassembly device according to claim 11, further comprising a measuring unit which measures fluctuations of the ATM cell, wherein said setting unit sets the value of the prescribed amount or first prescribed time on the basis of the result of measurement by said measuring unit.

13. The cell disassembly device according to claim 11 wherein the prescribed amount or first prescribed time is set independently for each STM buffer, and said cell disassembly unit determines the reading-start timing independently in each STM buffer.

14. The cell disassembly device according to claim 10, wherein the prescribed amount or first prescribed time is set independently for each virtual path, and said cell disassembly unit determines the reading-start timing independently or each set of one or more STM buffers corresponding to each respective virtual path.

15. The cell disassembly device according to claim 14, wherein said cell disassembly unit starts reading data from all STM buffers in said buffer unit corresponding to a same virtual path when the data accumulated amount reaches the prescribed amount or when the prescribed first time passes from the start of communication in more than a specified number of buffers corresponding to the same virtual path.

16. The cell disassembly device according to claim 14, wherein said cell disassembly unit starts reading action from all STM buffers in the buffer unit corresponding to same virtual path when the data accumulated amount reaches the prescribed amount or when the prescribed first time passes from the start of communication in all STM buffers corresponding to the same virtual path.

17. The cell disassembly device according to claim 10, wherein said cell disassembly unit stops, when an underflow occurs in the STM buffer, reading out from the STM buffer having the underflow, and resumes reading out when the data accumulated amount reaches again the prescribed amount or when a second prescribed time passes after occurrence of the underflow.

18. The cell disassembly device according to claim 1, wherein the buffer in each STM time slot includes a configuration that determines the STM frame to which data read out from the STM time slot is issued without using predetermined frame boundary information.

19. A cell disassembly method, the method comprising:

disassembling an ATM cell received from an ATM circuit interface, where the disassembling extracts data from payload, distributes data in plural STM time slots according to a sender, and sends out the distributed data to an STM circuit interface; and storing the data distributed in each STM time slot temporarily in a respective STM buffer, which is implemented in buffer unit for that time slot, and absorbing fluctuations of transferring the ATM cell to the STM time slots, wherein an input stage of the buffer unit converts between ATM timing and STM timing, and each STM buffer operates according to STM timing.

20. A computer-readable recording medium recording a computer program for causing a computer to execute a cell disassembly method, the method comprising:

disassembling an ATM cell received from an ATM circuit interface, wherein the disassembling extracts data from payload, distributes data in plural STM time slots according to a sender, and sends out the distributed data to an STM circuit interface; and storing the data distributed in each STM time slot temporarily in a respective STM buffer, which is implemented in a buffer unit for that time slot, and absorbing fluctuations of transferring the ATM cell to the STM time slots, wherein an input stage of the buffer unit converts between ATM timing and STM timing, and each STM buffer operates according to STM timing.

* * * * *